US012561054B2

(12) United States Patent
Kim et al.

(10) Patent No.: US 12,561,054 B2
(45) Date of Patent: Feb. 24, 2026

(54) METHOD AND APPARATUS FOR UNLOCKING BASED ON USER INPUT

(71) Applicant: KT&G CORPORATION, Daejeon (KR)

(72) Inventors: Yong Hwan Kim, Anyang-si (KR); Dong Sung Kim, Seoul (KR); Hunil Lim, Seoul (KR); Seok Su Jang, Daejeon (KR)

(73) Assignee: KT&G Corporation, Daejeon (KR)

( * ) Notice: Subject to any disclaimer, the term of this patent is extended or adjusted under 35 U.S.C. 154(b) by 179 days.

(21) Appl. No.: 18/285,752

(22) PCT Filed: Nov. 18, 2022

(86) PCT No.: PCT/KR2022/018301
§ 371 (c)(1),
(2) Date: Oct. 5, 2023

(87) PCT Pub. No.: WO2023/090934
PCT Pub. Date: May 25, 2023

(65) Prior Publication Data
US 2024/0118802 A1 Apr. 11, 2024

(30) Foreign Application Priority Data
Nov. 22, 2021 (KR) ........................ 10-2021-0161401

(51) Int. Cl.
*G06F 3/0488* (2022.01)
*A24F 40/50* (2020.01)
*G06F 21/36* (2013.01)

(52) U.S. Cl.
CPC ............ *G06F 3/0488* (2013.01); *A24F 40/50* (2020.01); *G06F 21/36* (2013.01)

(58) Field of Classification Search
CPC ........... A24F 40/50; A24F 40/53; A24F 40/60
See application file for complete search history.

(56) References Cited

U.S. PATENT DOCUMENTS

| | | | | |
|---|---|---|---|---|
| 9,992,327 | B1 * | 6/2018 | Sharifi Mehr | ........ H04M 1/236 |
| 10,039,327 | B2 | 8/2018 | Cameron | |
| 2018/0043114 | A1 | 2/2018 | Bowen et al. | |
| 2020/0057844 | A1 * | 2/2020 | Ouyang | .................. G06F 21/31 |

(Continued)

FOREIGN PATENT DOCUMENTS

| | | |
|---|---|---|
| EP | 3 610 735 A1 | 2/2020 |
| EP | 3 618 474 A1 | 3/2020 |
| EP | 3 711 582 A1 | 9/2020 |

(Continued)

OTHER PUBLICATIONS

Office Action Dated Nov. 19, 2024, received in Japanese Patent Application No. 2023-577212.

(Continued)

*Primary Examiner* — Deeprose Subedi
(74) *Attorney, Agent, or Firm* — Foley & Lardner LLP

(57) ABSTRACT
A method for unlocking the electronic device includes displaying a screen for verifying a registered user, determining whether a user is a registered user in the electronic device based on a user input to the screen for verifying a registered user, and unlocking the electronic device when the user is determined to be the registered user.

15 Claims, 13 Drawing Sheets

(56)         References Cited

U.S. PATENT DOCUMENTS

| | | | |
|---|---|---|---|
| 2020/0315259 | A1 | 10/2020 | Hubbard et al. |
| 2021/0007412 | A1* | 1/2021 | Nakano .................. A24F 40/57 |

FOREIGN PATENT DOCUMENTS

| | | |
|---|---|---|
| JP | 2015-225539 A | 12/2015 |
| JP | 2016-099909 A | 5/2016 |
| JP | 2018-169820 | 11/2018 |
| JP | 2019-521739 A | 8/2019 |
| JP | 2021-153586 | 10/2021 |
| JP | 2021-528979 A | 10/2021 |
| KR | 10-2015-0119788 A | 10/2015 |
| KR | 10-2016-0066544 A | 6/2016 |
| KR | 10-2021-0050325 A | 5/2021 |
| KR | 10-2021-0051716 A | 5/2021 |
| KR | 10-2021-0080942 A | 7/2021 |
| KR | 10-2021-0092081 A | 7/2021 |
| KR | 10-2021-0137579 A | 11/2021 |
| RU | 2 666 100 C2 | 9/2018 |
| RU | 2 710 771 C2 | 1/2020 |
| RU | 2 748 532 C1 | 5/2021 |
| WO | WO-2015/114806 A1 | 8/2015 |
| WO | WO-2015/190289 | 12/2015 |
| WO | 2021/085880 A1 | 5/2021 |
| WO | 2021/101673 A1 | 5/2021 |

OTHER PUBLICATIONS

International Search Report for PCT/KR2022/018301 dated Feb. 28, 2023 (PCT/ISA/210).

Written Opinion for PCT/KR2022/018301 dated Feb. 28, 2023 (PCT/ISA/237).

Office Action issued May 14, 2024 in Russian Application No. 2023132607/07.

Extended European Search Report issued on Sep. 11, 2025, for the corresponding EP Application No. 22896131.4.

* cited by examiner

120

METHOD AND APPARATUS FOR UNLOCKING BASED ON USER INPUT

CROSS REFERENCE TO RELATED APPLICATIONS

This application is the U.S. national phase of PCT Application No. PCT/KR2022/018301, filed Nov. 18, 2022, which claims priority to and the benefit of Korean Application No. 10-2021-0161401, filed Nov. 22, 2021, the contents of which are incorporated by reference in their entireties.

TECHNICAL FIELD

The following description relates to a user input-based unlocking method, and more particularly, to a technology for unlocking an aerosol-generating device based on a user input.

BACKGROUND ART

The demand for electronic cigarettes, or e-cigarettes, has recently been on the rise. The rising demand for e-cigarettes has accelerated the continued development of e-cigarette related functions. The e-cigarette related functions may include, for example, functions according to the types and characteristics of e-cigarettes.

DISCLOSURE OF INVENTION

Technical Goals

An aspect provides an unlocking method performed by an electronic device.

Another aspect provides an electronic device configured to perform unlocking based on a user input.

Technical Solutions

According to an aspect, there is provided a method of unlocking performed by an electronic device, the method including: displaying a screen for verification; determining whether a user is a registered user in the electronic device based on a user input to the screen; and based on determining that the user is the registered user, unlocking the electronic device.

The unlocking method may further include: based on determining that the user is not the registered user based on the user input, displaying the screen again; and when a number of times the user is determined to not be the registered user exceeds a threshold number of times, limiting a use of the electronic device.

The unlocking method may further include: displaying an icon corresponding to a preset operation in a locked state of the electronic device; and when a touch input to the icon is received from the user, executing the preset operation.

The preset operation may be heating an aerosol-generating substrate of a cigarette inserted in the electronic device.

The determining whether the user is the registered user may include determining whether the user is the registered user based on at least one of an input of a personal identification number (PIN) and an input of a pattern.

The PIN and the pattern may be previously registered.

The user input may be any one of a button input and a touch input.

According to another aspect, there is provided an aerosol-generating device performing an unlocking method, the aerosol-generating device including: a controller configured to control an operation of the aerosol-generating device; a display configured to display a screen for verification and receive a user input for the verification; an inserter into which a cigarette is inserted; and a heater configured to heat an aerosol-generating substrate of the cigarette. The controller may determine whether a user is a registered user in the aerosol-generating device based on a user input to the screen; and based on determining that the user is the registered user, unlock the aerosol-generating device.

The controller may display the screen again based on determining that the user is not the registered user; and limit a use of the aerosol-generating device when a number of times the user is determined not to be the registered user exceeds a threshold number of times.

The controller may display an icon corresponding to a preset operation in a locked state of the aerosol-generating device; and execute the preset operation when a touch input to the icon is received from the user.

The preset operation may be heating the aerosol-generating substrate of the cigarette inserted in the aerosol-generating device.

The controller may determine whether the user is the registered user based on at least one of an input of a PIN and an input of a pattern.

The PIN and the pattern may be previously registered.

The user input may be any one of a button input and a touch input.

Advantageous Effects

According to example embodiments described herein, a user input-based unlocking method performed by an electronic device is provided.

According to example embodiments described herein, an electronic device configured to perform a preset operation based on a user input even without unlocking is provided.

BEST MODE FOR CARRYING OUT INVENTION

Figure 1A:
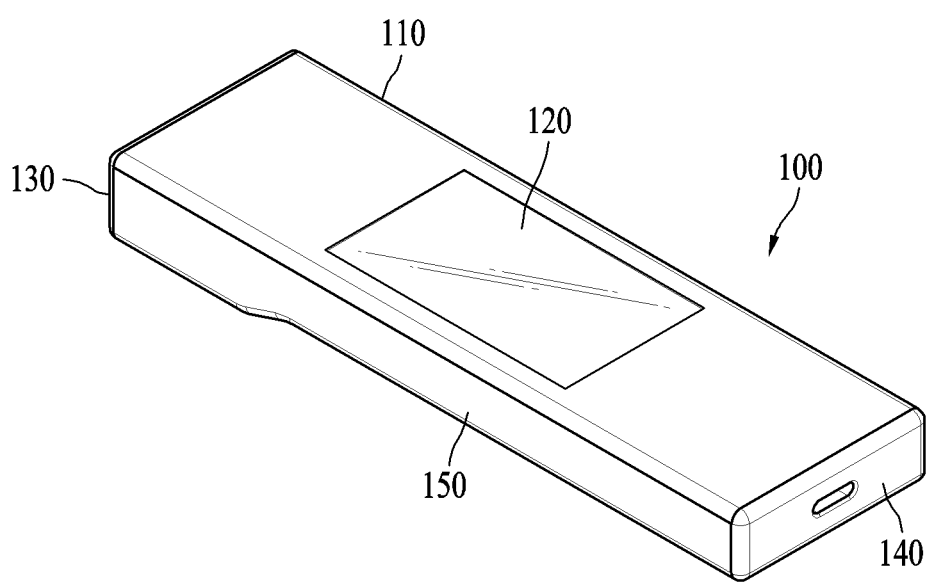
FIGS. 1A through 1C are perspective views of an electronic device according to an example embodiment.

The following detailed structural or functional description is provided merely as an example and various alterations and modifications may be made to examples. The examples are not construed as limited to the examples described in the present disclosure and should be understood to include all changes, equivalents, and replacements within the idea and the technical scope of the disclosure.

Terms such as "first," "second," and the like may be used herein to describe various components, but the components are not limited to the terms. These terms should be used only to distinguish one component from another component. For example, a "first" component may be referred to as a "second" component, or similarly, the "second" component may be referred to as the "first" component within the scope of the right according to the concept of the present disclosure.

It is to be understood that when a component is referred to as being "connected to" or "coupled to" another component, the component may be directly connected or coupled to the other component or intervening components may be present therebetween.

As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

Hereinafter, example embodiments will be described in detail with reference to the accompanying drawings. When describing the example embodiments with reference to the accompanying drawings, like reference numerals refer to like components and a repeated description related thereto will be omitted.

<Aerosol-Generating Device Performing Unlocking Based on User Input>

Figure 1B:
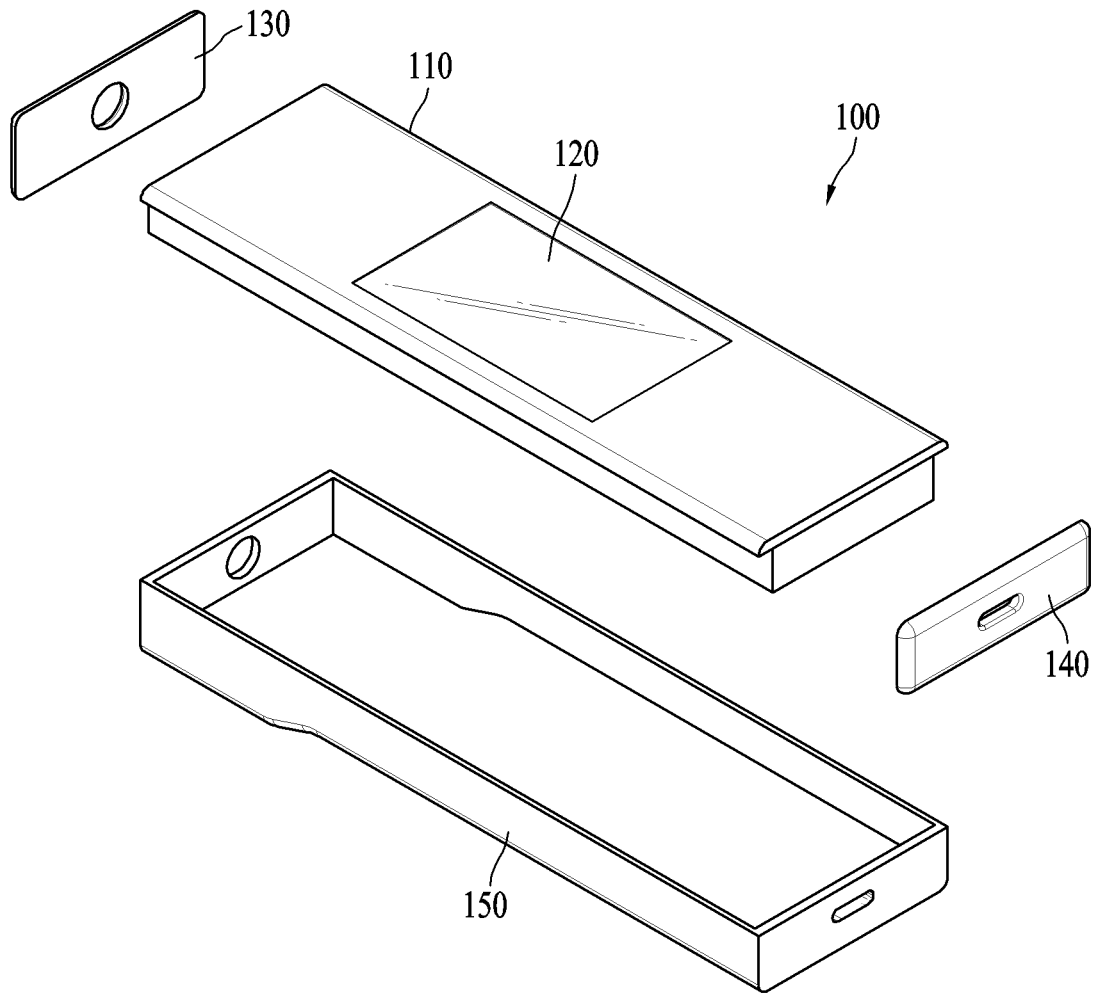
Figure 1C:
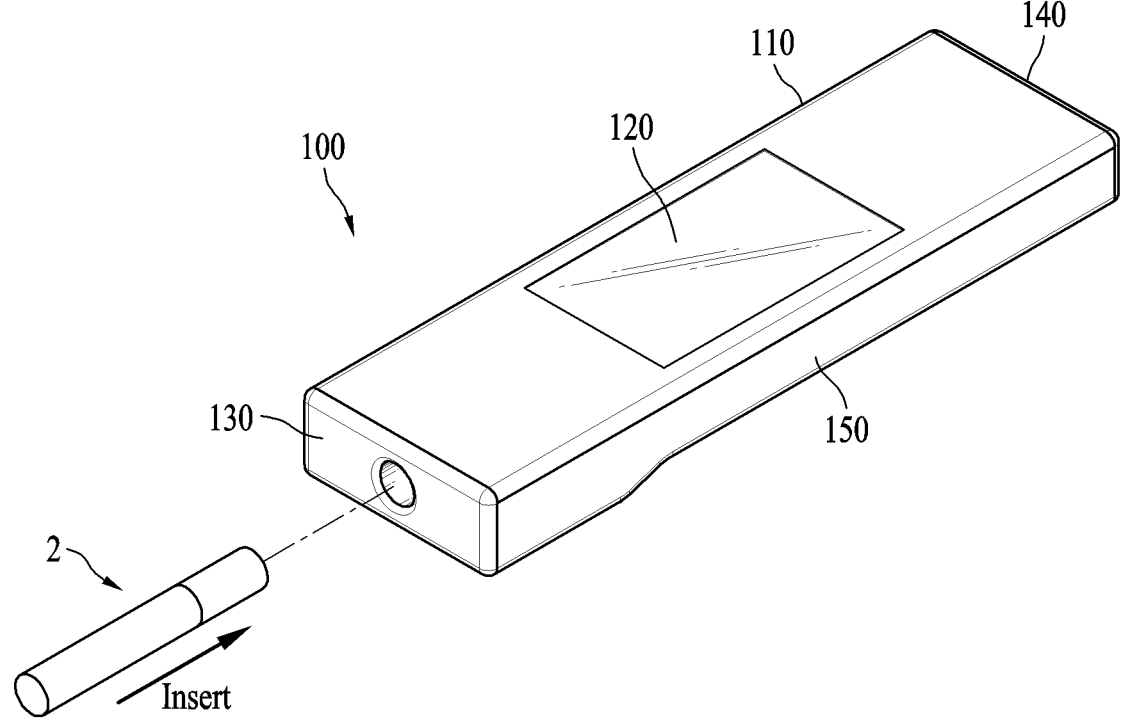

FIGS. 1A through 1C are perspective views of an electronic device according to an example embodiment.

Referring to FIGS. 1A and 1B, an electronic device 100 may include a front housing 110 including a display 120, an upper housing 130, a lower housing 140, and a rear housing 150. The respective housings may be connected mechanically or magnetically, and the shape of the electronic device 100 and a method of connecting the housings may be implemented in various ways. The electronic device 100 may include a circuit for performing operations in the housings. For example, the circuit for performing the operations may be implemented on a printed circuit board (PCB) and the PCB may be provided in the housings.

According to an example embodiment, the display 120 included in the front housing 110 may display a screen and receive a user input from a user. The user input may be any one of a button input and a touch input. The display 120 may include at least one of a mechanical button or a touch panel to receive the user input. Although the display 120 is illustrated as being attached to the outside of the front housing 110 in FIGS. 1A and 1B, examples are not limited thereto but the display 120 may be attached at any position of each housing.

Referring to FIG. 1B, the upper housing 130 may include a hole to insert a cigarette therein. The structure of the hole may be implemented in various ways depending on the type of cigarette. According to an example embodiment, to the upper housing 130, a sensor for sensing a type of cigarette to be inserted may be attached.

According to an example embodiment, the lower housing 140 may include a hole for connecting a power terminal for supplying power. The electronic device 100 may receive power from an external power source connected to the power terminal. The power terminal may be implemented as a universal serial bus (USB) port (e.g., USB C-type) but is not limited thereto, and may be implemented in various forms. Such a power terminal hole or power terminal of the lower housing 140 may include a sensor that senses whether a terminal of the external power source is connected thereto.

According to an example embodiment, the electronic device 100 may be an electronic device for generating an aerosol. For example, the electronic device 100 may include a heater that receives power from a power source such as a battery and heats an aerosol-generating substrate of a cigarette in an inserter. The aerosol-generating substrate heated by the heater may generate an aerosol. The configuration of the electronic device 100 will be described in detail below with reference to FIGS. 2 and 3.

Referring to FIG. 1C, the electronic device 100 may generate an aerosol by heating an aerosol-generating substrate in a cigarette 2 inserted in the electronic device 100. The user may then be able to inhale the generated aerosol to smoke. The electronic device 100 may heat the aerosol-generating substrate using various methods.

According to an example embodiment, the electronic device 100 may use a heating method by which the heater applies heat directly to the aerosol-generating substrate.

According to another example embodiment, the electronic device 100 may use an inductive heating method that does not directly heat the aerosol-generating substrate. For example, the aerosol-generating substrate may be heated based on an electromagnetic field generated as microwaves resonate, as in a microwave oven.

Referring to FIG. 1C, the cigarette 2 may be divided into a first portion including the aerosol-generating substrate and a second portion including a filter or the like. Alternatively, the second portion of the cigarette 2 may include the aerosol-generating substrate. The first portion may be entirely inserted into the electronic device 100, and the second portion may be exposed outside. Alternatively, the first portion may be only partially inserted into the electronic device 100, and the first portion may be entirely inserted and the second portion may be partially inserted into the electronic device 100. The user may inhale an aerosol with the second portion in their mouth. In this case, an aerosol may be generated as external air passes through the first portion, and the generated aerosol may be carried into the mouth of the user through the second portion.

Figure 2:
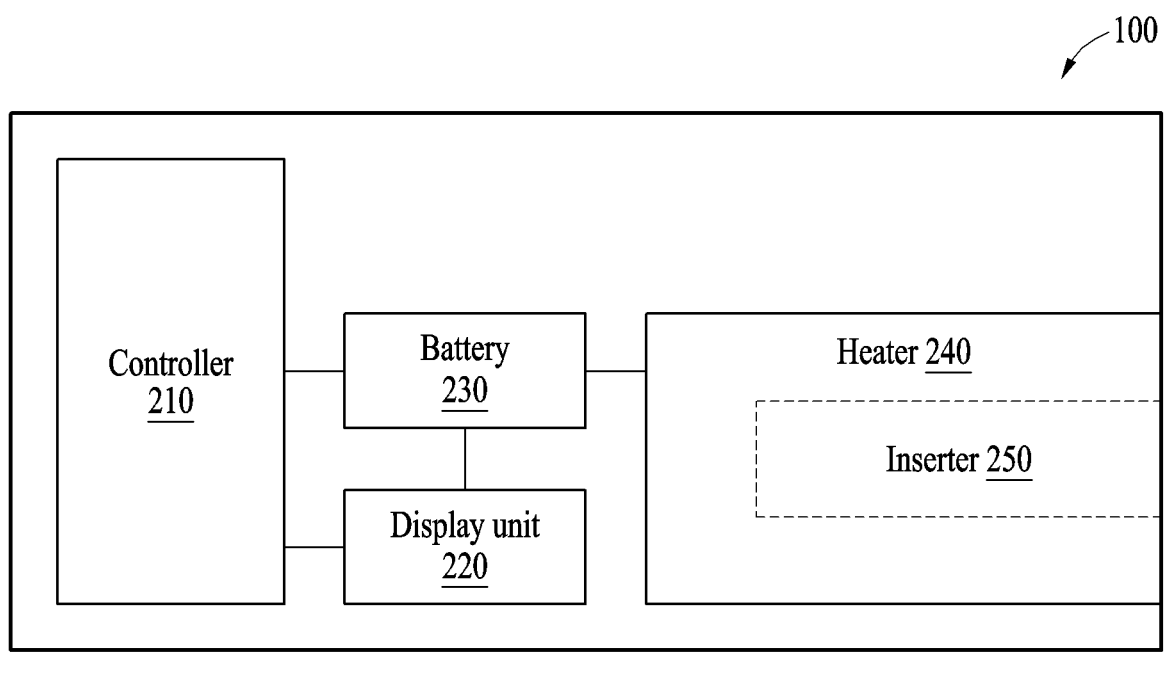
FIG. 2 is a diagram illustrating a configuration of an electronic device according to an example embodiment.

FIG. 2 is a diagram illustrating a configuration of an electronic device according to an example embodiment.

According to an example embodiment, the electronic device 100 may include a controller 210, a display unit 220, a battery 230, a heater 240, and an inserter 250. The electronic device 100 may further include general-purpose components. For example, the electronic device 100 may further include at least one sensor (e.g., a puff sensor, a temperature sensor, a cigarette insertion detection sensor, a power terminal detection sensor, etc.) and a motor for outputting tactile information and/or feedback. As described above with reference to FIGS. 1A through 1C, the electronic device 100 may be manufactured to have a structure that allows external air to be introduced or internal gas to be discharged even while the cigarette 2 is inserted.

For example, the external air may be introduced through at least one air path formed in the electronic device 100. In this example, the opening or closing and the size of the air path formed in the electronic device 100 may be adjusted by the user. Accordingly, an amount of atomization, a sense of smoking, or the like may be adjusted by the user. For another example, the external air may be introduced into the inside of the cigarette 2 through at least one hole formed on a surface of the cigarette 2.

According to an example embodiment, the electronic device 100 may be included in a system along with a separate cradle. For example, the cradle may be used to charge the battery 230 of the electronic device 100.

The controller 210 may control operations of the electronic device 100. The controller 210 will be described in detail below with reference to FIG. 3.

The display unit 220 may output visual information through the display 120 described above with reference to FIGS. 1A through 1C, and receive a user input from the user. The user input may be, for example, any one of a button input and a touch input.

The battery 230 may supply power to the electronic device 100. The battery 230 may receive power from an external power source. For example, as described above with reference to FIGS. 1A through 1C, the lower housing 140 may include a hole for a power terminal, through which power is received from the external power source, and the battery 230 may thereby be charged.

The heater 240 may heat an aerosol-generating substrate of a cigarette provided in the inserter 250. The heater 240 may heat the aerosol-generating substrate in various ways, as described above with reference to FIG. 1C.

According to an example embodiment, the cigarette 2 of various types may be inserted into the inserter 250. The cigarette 2 may be of a cut tobacco type having a shape as whole tobacco that is directly lit to smoke, a granular type in which an aerosol-generating material provided in the form of granules or capsules is inserted in a cigarette, or a liquid type including a liquid composition. A cigarette of the liquid type may be manufactured in the form of a stick, and may include a liquid that includes a tobacco-containing material including a volatile tobacco flavor component or a liquid that includes a non-tobacco material in the stick.

According to an example embodiment, the cigarette 2 may be inserted such that the inserter 250 surrounds at least a portion (e.g., the aerosol-generating substrate) of the cigarette 2, and the aerosol-generating substrate may be heated by the heater 240. For example, the cigarette 2 may be divided into a first portion including the aerosol-generating substrate and a second portion including a filter or the like. Alternatively, the second portion of the cigarette 2 may also include the aerosol-generating substrate.

The first portion may be entirely inserted into the electronic device 100, and the second portion may be exposed outside. Alternatively, the first portion may be partially inserted into the electronic device 100, and the first portion may be entirely inserted and the second portion may be partially inserted into the electronic device 100. The user may inhale an aerosol with the second portion in their mouth. In this case, an aerosol may be generated as external air passes through the first portion, and the generated aerosol may pass through the second portion to be carried into the mouth of the user.

According to an example embodiment, the electronic device 100 may further include a communication module including a Bluetooth chip or a Wi-Fi chip, and the controller 210 may use the communication module to communicate with an external device such as a server over a network. When a hub device such as an access point (AP) is present around the electronic device 100, the controller 210 may use the hub device to communicate with the server.

Figure 3:
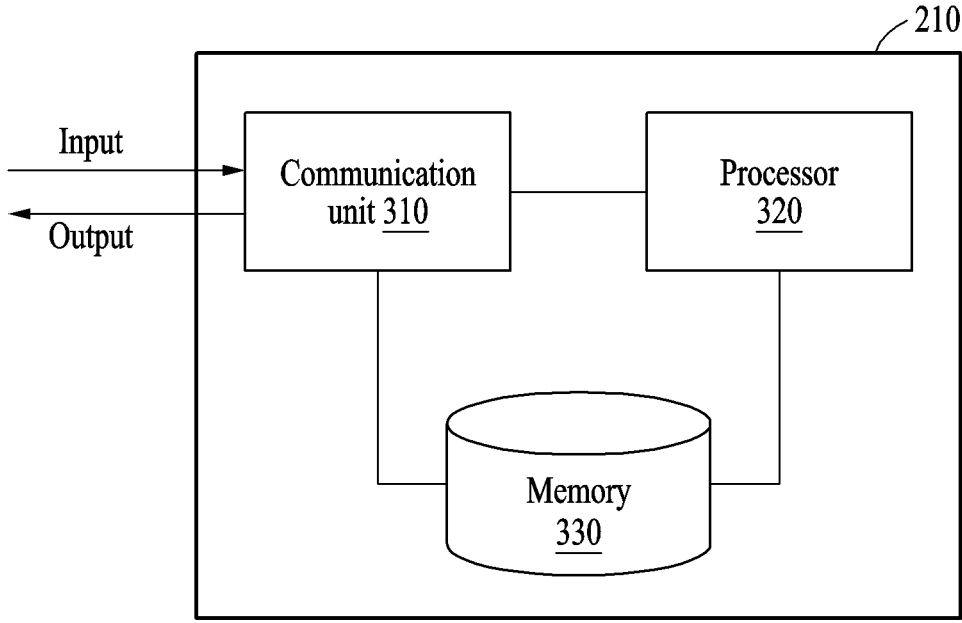
FIG. 3 is a diagram illustrating a configuration of a controller according to an example embodiment.

FIG. 3 is a diagram illustrating a configuration of a controller according to an example embodiment.

According to an example embodiment, the controller 210 may include a communication unit 310, a processor 320, and a memory 330.

The communication unit 310 may be connected to the processor 320 and the memory 330 to transmit and receive data thereto and therefrom. The communication unit 310 may be connected to another external device to transmit and receive data thereto and therefrom. Hereinafter, transmitting and receiving "A" may refer to transmitting and receiving "information or data indicating A."

The communication unit 310 may be implemented as a circuitry in the controller 210. For example, the communication unit 310 may include an internal bus and an external bus. For another example, the communication unit 310 may be an element that connects the controller 210 and an external device. The communication unit 310 may be an interface. The communication unit 310 may receive data from the external device and transmit the data to the processor 320 and the memory 330.

The processor 320 may process the data received by the communication unit 310 and data stored in the memory 330. A processor described herein may be a hardware-implemented processing device having a physically structured circuit to execute desired operations. The desired operations may include, for example, code or instructions included in a program. The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The processor 320 may execute computer-readable code (e.g., software) stored in a memory (e.g., the memory 330) and instructions triggered by the processor 320.

The memory 330 may store therein the data received by the communication unit 310 and the data processed by the processor 320. For example, the memory 330 may store therein the program (or an application, or software). The program to be stored may be a set of syntaxes that are coded and executable by the processor 320 to control the electronic device 100.

The memory 330 may include, for example, at least one volatile memory, non-volatile memory, random-access memory (RAM), flash memory, hard disk drive, and optical disc drive.

The memory 330 may store an instruction set (e.g., software) for operating the controller 210. The instruction set for operating the controller 210 may be executed by the processor 320.

The communication unit 310, the processor 320, and the memory 330 will be described in detail below with reference to FIGS. 4A through 7.

Figure 4A:
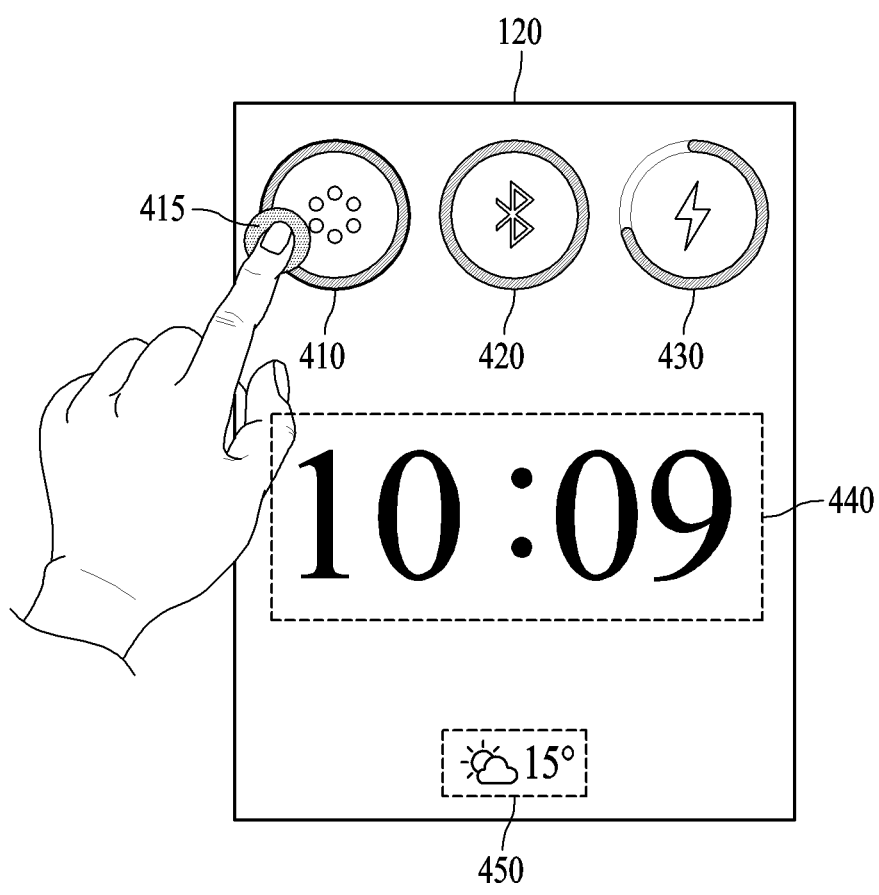
FIGS. 4A, 4B, and 4C are diagrams illustrating examples of a screen displayed on an electronic device according to an example embodiment.
Figure 4B:
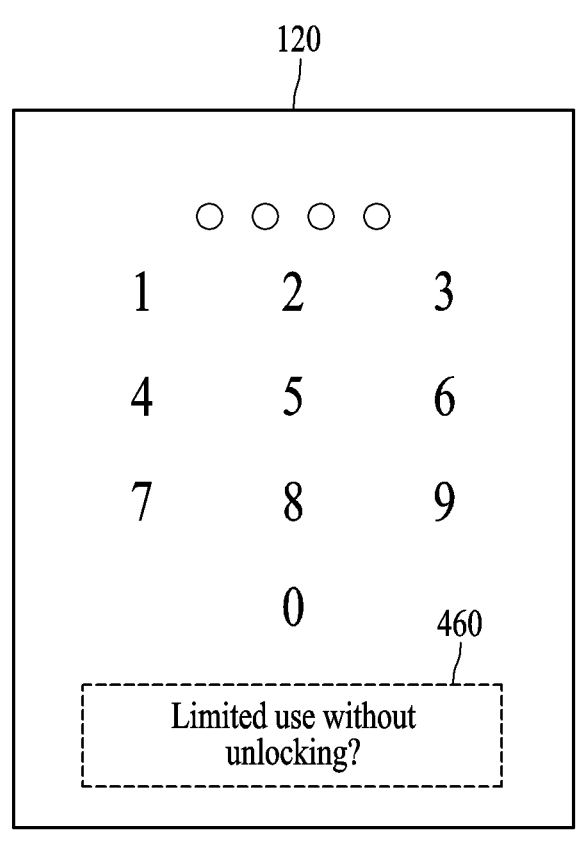
Figure 4C:
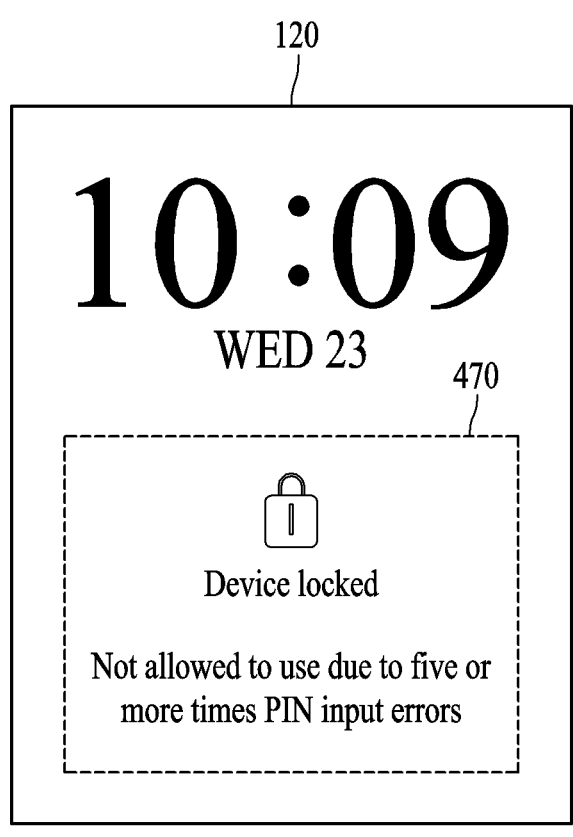

FIGS. 4A and 4C are diagrams illustrating examples of a screen displayed on an electronic device according to an example embodiment.

FIG. 4A illustrates a main screen displayed through the display 120 of the electronic device 100. On the main screen, an icon 410 for setting the use of the electronic device 100, i.e., for generating an aerosol, an icon 420 for setting a communication state (e.g., Bluetooth status), and an icon 430 for checking battery information may be displayed. On the main screen, time information 440 and weather information 450 may also be displayed.

According to an example embodiment, the processor 320 described above with reference to FIG. 3 may receive a user input from a user through a touch, tap, drag, or the like on the display 120. For example, when the user taps (or touches, indicated by a reference numeral 415) the icon 410 for generating an aerosol on a screen displayed on the display 120 as shown in FIG. 4A, the processor 320 may heat an aerosol-generating substrate of a cigarette 2 in the inserter 250 through the heater 240.

According to an example embodiment, the electronic device 100 may heat the aerosol-generating substrate of the cigarette 2 to generate an aerosol the user may inhale to smoke as described above with reference to FIGS. 1A through 3, and may also provide other functions to the user. For example, the electronic device 100 may provide the time information 440 and the weather information 450, and may also perform an operation through an application installed in the electronic device 100.

The application installed in the electronic device 100 may include an application associated with personal information, for example, a messenger application and an email application, and thus there may be a demand for a function of locking the electronic device 100 to prevent others from arbitrarily using the electronic device 100.

FIG. 4B illustrates a screen for verifying a registered user in the electronic device 100 to which a locking function is added. The screen for verifying a registered user may also be referred to as a lock screen.

Before the main screen is displayed as shown in FIG. 4A, the screen shown in FIG. 4B may be displayed to determine whether the user is a registered user. According to an example embodiment, as an attempt to unlock is detected through the display 120, the processor 320 may display the lock screen as shown in FIG. 4B. This unlocking attempt may be detected in various ways. For example, the processor 320 may detect the unlocking attempt through a key input through a physical button, a screen tap or touch, or the like. According to another example embodiment, the electronic device 100 may further include a sensor for detecting gravity, and the processor 320 may detect such an unlocking attempt by detecting a change in the position of the electronic device 100 through the sensor. According to still another example embodiment, the electronic device 100 may further include an image capturing device or a motion detection sensor, and the processor 320 may detect the unlocking attempt when a motion is detected.

Although FIG. 4B illustrates the screen for verifying a registered user based on an input of a personal identification number (PIN), examples are not limited thereto. For example, the screen for verifying a registered user based on an input of a pattern may also be displayed. For another example, when a biometric authentication function is implemented in the electronic device 100, a screen including a guide message for fingerprint recognition or facial recognition may be displayed. In these examples, information used to verify whether the user is a registered user, such as, for example, a PIN, a pattern, a fingerprint, a face, or the like may be previously generated and stored in the memory 330. When it is determined that the user is a registered user based on a user input, the processor 320 may unlock the electronic device 100 and display the main screen as shown in FIG. 4A. An unlocking method based on a user input will be described in detail below with reference to FIG. 5.

According to an example embodiment, the user may limitedly use some functions of the electronic device 100 without unlocking according to settings. The processor 320 may display an icon corresponding to an operation preset to be available even in a locked state on the screen for verifying whether the user is a registered user as shown in FIG. 4B. Referring to FIG. 4B, a guide message 460 indicating that the electronic device 100 is available to use in a limited manner without unlocking may be displayed. However, examples are not limited thereto, and various examples of providing a limited function even in the locked state may be implemented in various ways.

According to an example embodiment, applications available even in the locked state may be determined in advance, and icons for the applications may be displayed on the screen for verifying whether the user is a registered user as shown in FIG. 4B. For example, the user may determine in advance that a watch application and a camera application are unrelated to personal information and may set them in advance to be accessible even when the electronic device 100 is locked. According to another example embodiment, the applications that are available even in the locked state may be determined in advance and may be implemented to be added or deleted by the user.

The user may set a function of heating an aerosol-generating substrate to be available without unlocking. For example, when a user input indicating that some functions of the electronic device 100 will be used in a limited manner is received on the screen as shown in FIG. 4B, the processor 320 may display the screen as shown in FIG. 4A. The user may input a command for heating to the electronic device 100 by tapping the icon 410 for generating an aerosol on the displayed screen, and the electronic device 100 may then heat the aerosol-generating substrate of the cigarette 2 in the inserter 250 through the heater 240. According to another example embodiment, the icon 410 for generating an aerosol of FIG. 4A may be displayed on the screen for verifying whether the user is a registered user, and the aerosol-generating substrate may be heated according to a user input. As the aerosol-generating substrate of the inserted cigarette 2 is heated, the user may then be able to inhale an aerosol generated thereby.

Adding a locking function to the electronic device 100 but limitedly allowing some functions may enable the user to maintain security for functions that have a risk of exposing personal information, such as a messenger application, while quickly using functions unrelated to personal information, such as, an aerosol generating function. A method of limitedly performing operations without unlocking by the electronic device 100 will be described in detail below with reference to FIG. 6.

FIG. 4C illustrates a screen to be displayed when it is determined that the user is not a registered user from the screen for determining whether the user is a registered user as shown in FIG. 4B. The processor 320 may determine whether the user is a registered user based on a user input, and may maintain a locked state of the electronic device 100 when it is determined that the user is not a registered user. For example, the processor 320 may determine whether the user is a registered user by comparing a number or pattern input from the user, or fingerprint and face information recognized by a biometric sensor to preregistered PIN, pattern, and fingerprint and face information.

According to an example embodiment, when the number of times the user is determined not to be a registered user exceeds a threshold number of times, a guide message 470 may be displayed as shown in FIG. 4C. The locked state of the electronic device 100 may be maintained for a predetermined time (e.g., 5 minutes), and the screen for verifying whether the user is a registered user as shown in FIG. 4B may be displayed again after the predetermined time has elapsed. An operating method of the electronic device 100 to be performed when the user is determined not to be a registered user will be described in detail below with reference to FIG. 7.

<Unlocking Method Based on User Input>

Figure 5:
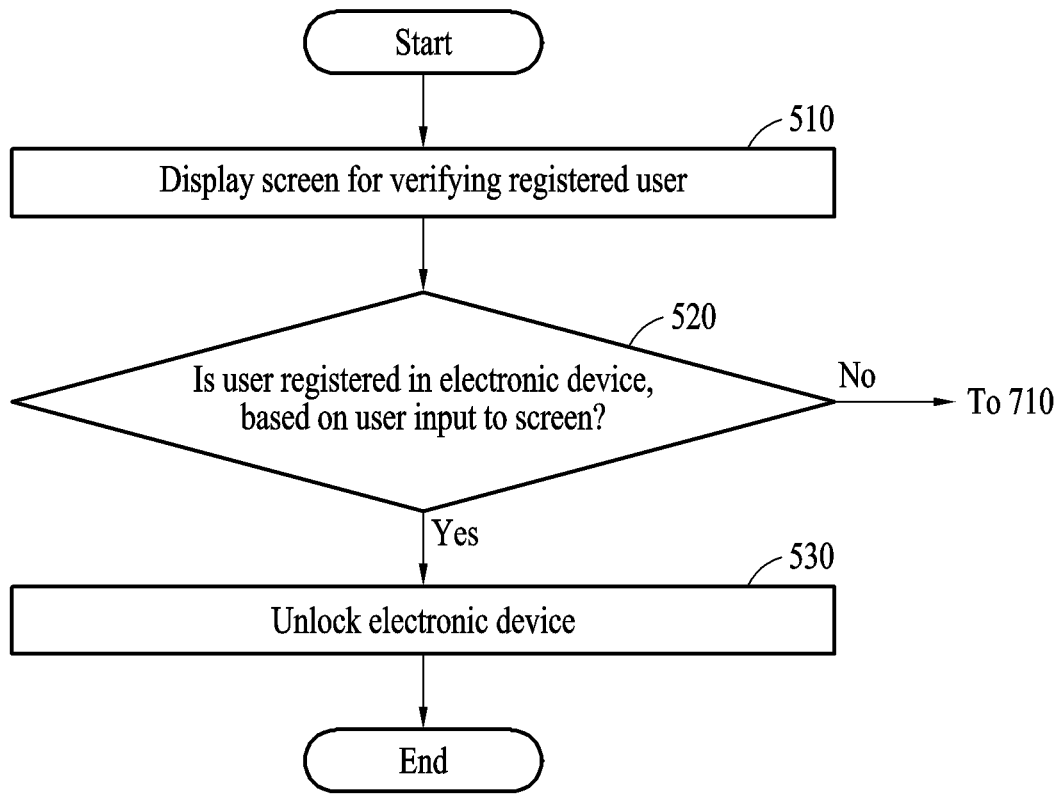
FIG. 5 is a flowchart illustrating a user input-based unlocking method according to an example embodiment.

FIG. 5 is a flowchart illustrating a user input-based unlocking method according to an example embodiment.

Operations 510 to 530 described hereinafter may be performed by the processor 320 of the electronic device 100 described above with reference to FIGS. 1A through 4C, and repeated descriptions thereof will be omitted for conciseness.

In operation 510, the processor 320 may display a screen for verifying whether a user is a registered user. As described above with reference to FIGS. 4A through 4C, the processor 320 may detect various types of attempt to unlock, and may display a screen for inputting a PIN, a screen for inputting a pattern, a screen for recognizing a fingerprint, a screen for recognizing a face, or the like.

In operation 520, the processor 320 may determine whether the user is a registered user in the electronic device 100 based on a user input to the screen. For example, the processor 320 may determine whether the user is the registered user by comparing the user input (e.g., a number or pattern input from the user, or fingerprint or face information recognized by a biometric authentication sensor) to prestored information (e.g., preregistered PIN, pattern, and fingerprint and face information). An operation to be performed by the processor 320 when it is determined that the user is not the registered user will be described in detail below with reference to FIG. 7.

In operation 530, when it is determined that the user is the registered user, the processor 320 may unlock the electronic device 100. According to an example embodiment, the main screen as shown in FIG. 4A may be displayed to the user.

Figure 6:
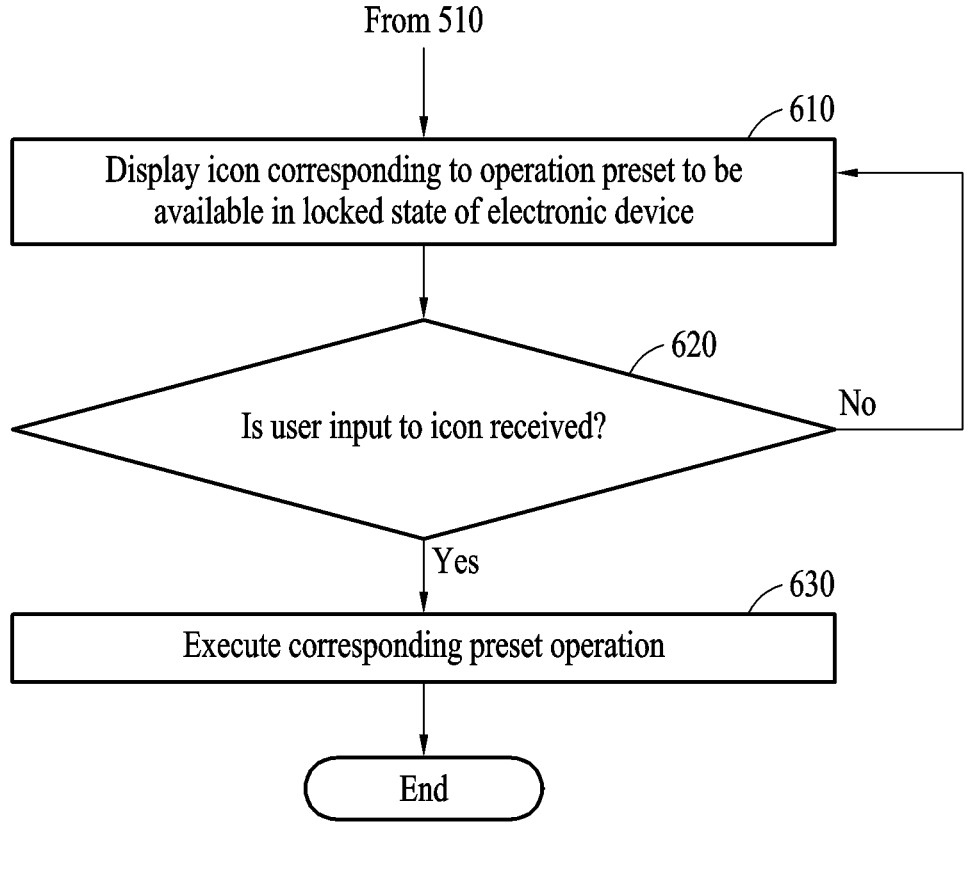
FIG. 6 is a flowchart illustrating a method of limitedly performing an operation without unlocking according to an example embodiment.

FIG. 6 is a flowchart illustrating a method of limitedly performing an operation without unlocking according to an example embodiment.

Operations 610 to 630 described hereinafter may be performed by the processor 320 of the electronic device 100 described above with reference to FIGS. 1A through 5, and repeated descriptions thereof will be omitted for conciseness. Operations 610 to 630 may be performed after operation 510 described above with reference to FIG. 5 is performed.

In operation 610, the processor 320 may display an icon corresponding to an operation preset to be available in a locked state of the electronic device 100. As described above with reference to FIG. 4B, the processor 320 may display a screen indicating a limited use of the electronic device 100 in the locked state or display the icon corresponding to the operation preset to be available even in the locked state. For example, when an operation of heating an aerosol-generating substrate is preset to be available even in the locked state of the electronic device 100, the processor 320 may display an icon corresponding to the operation of heating the aerosol-generating substrate on a screen for verifying a user.

In operation 620, the processor 320 may receive a user input to the icon. For example, the processor 320 may receive, as the user input, a touch input to the icon or a key input through a button.

In operation 630, the processor 320 may execute the preset operation corresponding to the icon for which the user input is received.

For example, when the user input is received with respect to the icon corresponding to the operation of heating the aerosol-generating substrate, the processor 320 may heat the aerosol-generating substrate of the cigarette 2 in the inserter 250 through the heater 240. Through operations 610 to 630 described above, the user may selectively use a locking function of the electronic device 100, and user convenience may thereby be improved.

Figure 7:
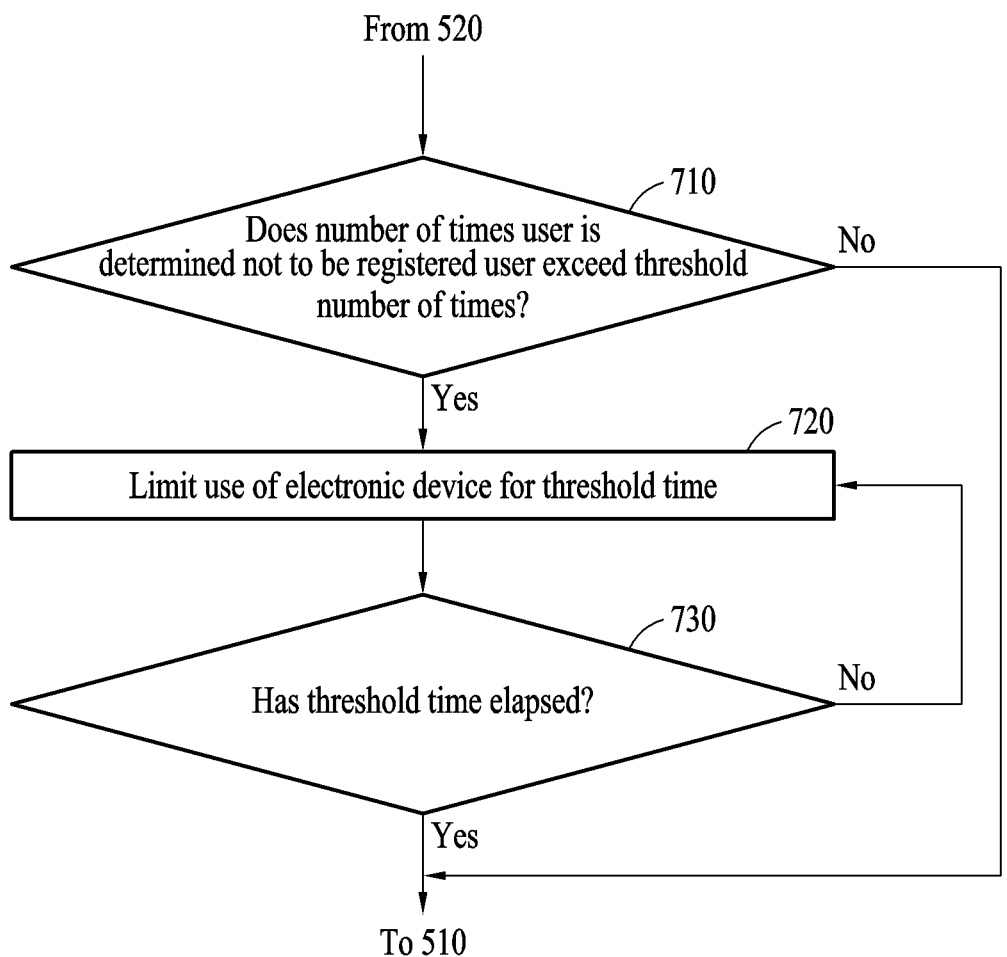
FIG. 7 is a flowchart illustrating a user input processing method performed when a user is determined not to be a registered user according to an example embodiment.

FIG. 7 is a flowchart illustrating a user input processing method performed when a user is determined not to be a registered user according to an example embodiment.

Operations 710 to 730 described hereinafter may be performed by the processor 320 of the electronic device 100 described above with reference to FIGS. 1A through 6, and repeated descriptions thereof will be omitted for conciseness. According to an example embodiment, operations 710 to 730 may be performed when it is determined that a user is not a registered user in the electronic device 100 in operation 520 described above with reference to FIG. 5.

In operation 710, the processor 320 may determine whether the number of times the user is determined not to be the registered user exceeds a threshold number of times. When the number of times the user is determined not to be the registered user does not exceed the threshold number of times, the processor 320 may display again a screen for verifying a registered user as in operation 510 described above with reference to FIG. 5.

In operation 720, when the number of times the user is determined not to be the registered user exceeds the threshold number of times, the processor 320 may limit the use of the electronic device 100 for a threshold period of time. As described above with reference to FIG. 4C, the processor 320 may display the guide message 470 indicating that the electronic device 100 is unavailable for a threshold period of time (e.g., 5 minutes).

In operation 730, when the threshold period of time has elapsed, the processor 320 may display again the screen for verifying a registered user as in operation 510 described above with reference to FIG. 5.

Figure 8:
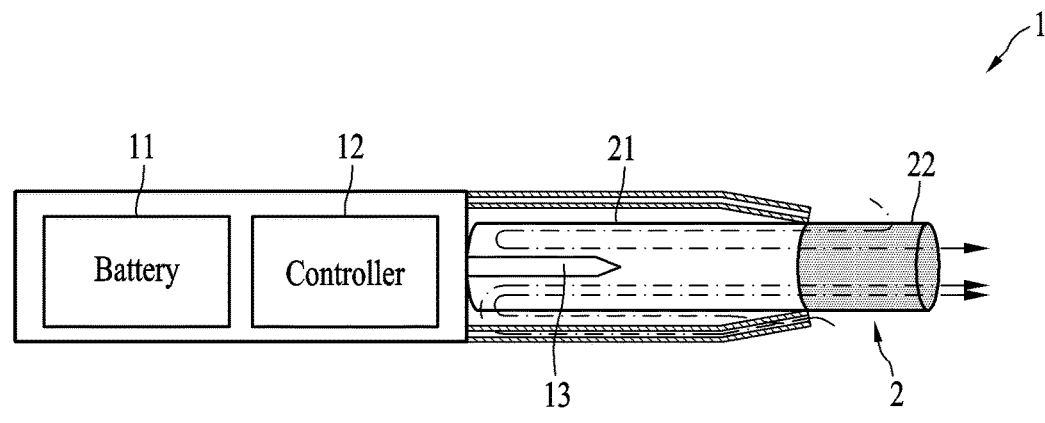
FIGS. 8 through 10 are diagrams illustrating examples of the insertion of a cigarette in an aerosol-generating device according to an example embodiment.
Figure 9:
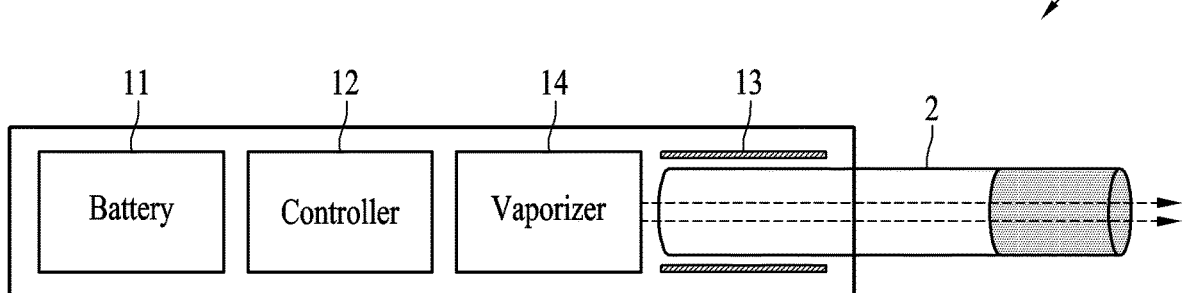
Figure 10:
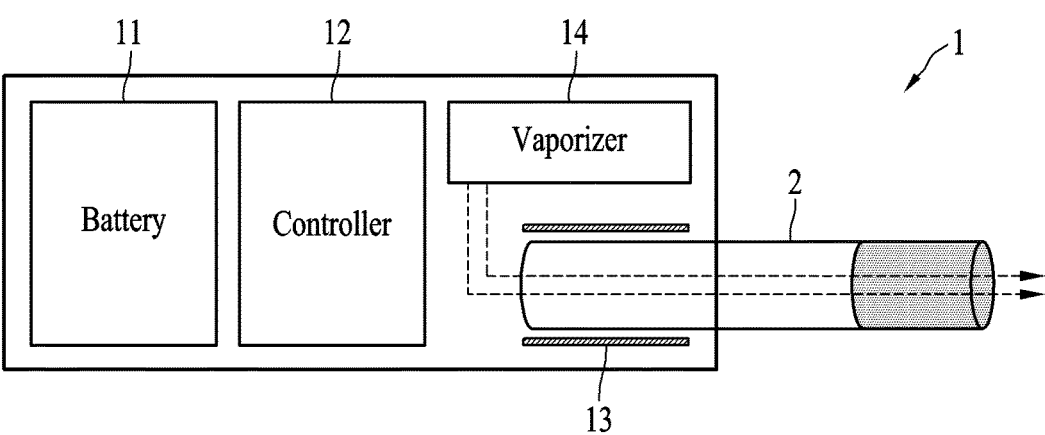

FIGS. 8 through 10 are diagrams illustrating examples of the insertion of a cigarette in an aerosol-generating device according to an example embodiment.

In the examples described hereinafter with reference to FIGS. 8 through 10, an aerosol-generating device 1 may correspond to the electronic device 100 described above with reference to FIGS. 1A through 2. A battery 11 may correspond to the battery 230 described above with reference to FIG. 2. A controller 12 may correspond to the controller 210 described above with reference to FIG. 2. A vaporizer 14 or a heater 13 may correspond to the heater 240 described above with reference to FIG. 2.

Referring to FIG. 8, the aerosol-generating device 1 may include the battery 11, the controller 12, and the heater 13. Referring to FIGS. 9 and 10, the aerosol-generating device 1 may further include a vaporizer 14. In addition, a cigarette 2 may be inserted into an inner space of the aerosol-generating device 1.

The aerosol-generating device 1 shown in FIGS. 8 through 10 may include components related to the example embodiments described herein. Therefore, it is to be understood by those having ordinary skill in the art to which the present disclosure pertains that the aerosol-generating device 1 may further include other generally used components in addition to the ones shown in FIGS. 8 through 10.

In addition, although it is shown in FIGS. 9 and 10 that the heater 13 is included in the aerosol-generating device 1, the heater 13 may be omitted as needed.

FIG. 8 illustrates a linear alignment of the battery 11, the controller 12, and the heater 13. FIG. 9 illustrates a linear alignment of the battery 11, the controller 12, the vaporizer 14, and the heater 13. FIG. 10 illustrates a parallel alignment of the vaporizer 14 and the heater 13. However, the internal structure of the aerosol-generating device 1 is not limited to what is shown in FIGS. 8 through 10. That is, such alignments of the battery 11, the controller 12, the heater 13, and the vaporizer 14 may be changed depending on the design of the aerosol-generating device 1.

When the cigarette 2 is inserted in the aerosol-generating device 1, the aerosol-generating device 1 may operate the heater 13 and/or the vaporizer 14 to generate an aerosol. The aerosol generated by the heater 13 and/or the vaporizer 14 may pass through the cigarette 2 into the user.

Even when the cigarette 2 is not inserted in the aerosol-generating device 1, the aerosol-generating device 1 may heat the heater 13, as needed.

The battery 11 may supply power to be used to operate the aerosol-generating device 1. For example, the battery 11 may supply power to heat the heater 13 or the vaporizer 14, and may supply power required for the controller 12 to operate. In addition, the battery 11 may supply power required to operate a display, a sensor, a motor, or the like installed in the aerosol-generating device 1.

The controller 12 may control the overall operation of the aerosol-generating device 1. For example, the controller 12 may control respective operations of other components included in the aerosol-generating device 1, in addition to the battery 11, the heater 13, and the vaporizer 14. In addition, the controller 12 may verify a state of each of the components of the aerosol-generating device 1 to determine whether the aerosol-generating device 1 is in an operable state.

The controller 12 may include at least one processor. The processor may be implemented as an array of a plurality of logic gates, or may be implemented as a combination of a general-purpose microprocessor and a memory in which a program executable in the microprocessor is stored. In addition, it is to be understood by those having ordinary skill in the art to which the present disclosure pertains that the processor may be implemented in other types of hardware.

The heater 13 may be heated by power supplied by the battery 11. For example, when the cigarette 2 is inserted in the aerosol-generating device 1, the heater 13 may be disposed outside the cigarette 2. The heated heater 13 may thus raise the temperature of an aerosol-generating material in the cigarette 2.

For example, the heater 13 may be an electrically resistive heater. In this example, the heater 13 may include an electrically conductive track, and the heater 13 may be heated as a current flows through the electrically conductive track. However, the heater 13 is not limited to the foregoing example, and any example of heating the heater 13 up to a desired temperature may be applicable without limitation. The desired temperature may be preset in the aerosol-generating device 1 or may be set by the user.

For another example, the heater 13 may be an inductive heating-type heater. In this example, the heater 13 may include an electrically conductive coil for heating the cigarette 2 in an inductive heating manner, and the cigarette 2 may include a susceptor to be heated by the inductive heating-type heater.

For example, the heater 13 may include a tubular heating element, a plate-shaped heating element, a needle-shaped heating element, or a rod-shaped heating element, and may heat the inside or outside of the cigarette 2 according to the shape of a heating element.

In addition, the heater 13 may be provided as a plurality of heaters in the aerosol-generating device 1. In this case, the heaters may be disposed to be inserted into the cigarette 2, or may be disposed outside the cigarette 2. In addition, some of the heaters may be disposed to be inserted into the cigarette 2, and the rest may be disposed outside the cigarette 2. However, the shape of the heater 13 is not limited to what is shown in FIGS. 8 through 10 but may be provided in various shapes.

The vaporizer 14 may heat a liquid composition to generate an aerosol, and the generated aerosol may pass through the cigarette 2 into the user. That is, the aerosol generated by the vaporizer 14 may travel along an airflow path of the aerosol-generating device 1, and the airflow path may be configured such that the aerosol generated by the vaporizer 14 passes through the cigarette 2 to be into the user.

For example, the vaporizer 14 may include a liquid storage, a liquid transfer means, and a heating element, but is not limited thereto. For example, the liquid storage, the liquid transfer means, and the heating element may be included as independent modules in the aerosol-generating device 1.

The liquid storage may store the liquid composition. The liquid composition may be, for example, a liquid including a tobacco-containing material that includes a volatile tobacco flavor component, or may be a liquid including a non-tobacco material. The liquid storage may be manufactured to be detachable and attachable from and to the vaporizer 14, or may be manufactured in an integral form with the vaporizer 14.

The liquid composition may include, for example, water, a solvent, ethanol, a plant extract, a fragrance, a flavoring agent, or a vitamin mixture. The fragrance may include, for example, menthol, peppermint, spearmint oil, various fruit flavors, and the like, but is not limited thereto. The flavoring agent may include ingredients that provide the user with a variety of flavors or scents. The vitamin mixture may be a mixture of at least one of vitamin A, vitamin B, vitamin C, or vitamin E, but is not limited thereto. The liquid composition may also include an aerosol former such as glycerin and propylene glycol.

The liquid transfer means may transfer the liquid composition in the liquid storage to the heating element. The liquid transfer means may be, for example, a wick such as cotton fiber, ceramic fiber, glass fiber, or porous ceramic, but is not limited thereto.

The heating element may be an element for heating the liquid composition transferred by the liquid transfer means. The heating element may be, for example, a metal heating wire, a metal heating plate, a ceramic heater, or the like, but is not limited thereto. In addition, the heating element may include a conductive filament such as a nichrome wire, and may be arranged in a structure wound around the liquid transfer means. The heating element may be heated as a current is supplied and may transfer heat to the liquid composition in contact with the heating element, and may thereby heat the liquid composition. As a result, an aerosol may be generated.

For example, the vaporizer 14 may also be referred to as a cartomizer or an atomizer, but is not limited thereto.

The aerosol-generating device 1 may further include general-purpose components in addition to the battery 11, the controller 12, the heater 13, and the vaporizer 14. For example, the aerosol-generating device 1 may include a display that outputs visual information and/or a motor that outputs tactile information and/or feedback. In addition, the aerosol-generating device 1 may include at least one sensor (e.g., a puff sensor, a temperature sensor, a cigarette insertion detection sensor, etc.). In addition, the aerosol-generating device 1 may be manufactured to have a structure allowing external air to be introduced or internal gas to flow out even while the cigarette 2 is inserted.

According to one or more embodiments, the aerosol-generating device 1 may constitute a system along with a separate cradle. For example, the cradle may be used to charge the battery 11 of the aerosol-generating device 1. Alternatively, the cradle may be used to heat the heater 13, with the cradle and the aerosol-generating device 1 coupled.

The cigarette 2 may be of a similar type to a general burning type. For example, the cigarette 2 may be divided into a first portion including an aerosol-generating material and a second portion including a filter or the like. Alternatively, the second portion of the cigarette 2 may also include the aerosol-generating material. For example, the aerosol-generating material provided in the form of granules or capsules may be inserted into the second portion.

The first portion may be entirely inserted into the aerosol-generating device 1, and the second portion may be exposed outside. Alternatively, the first portion may be partially inserted into the aerosol-generating device 1, and the first portion may be entirely inserted and the second portion may be partially inserted into the aerosol-generating device 1. The user may then inhale an aerosol with the second portion in their mouth. In this case, an aerosol may be generated as external air passes through the first portion, and the generated aerosol may pass through the second portion to be into the mouth of the user.

For example, the external air may be introduced through at least one air path formed in the aerosol-generating device 1. In this example, the opening or closing and/or the size of the air path formed in the aerosol-generating device 1 may be adjusted by the user. Accordingly, an amount of atomization, a sense of smoking, or the like may be adjusted by the user. For another example, the external air may be introduced into the inside of the cigarette 2 through at least one hole formed on a surface of the cigarette 2.

Hereinafter, examples of the cigarette 2 will be described with reference to FIGS. 11 and 12.

Figure 11:
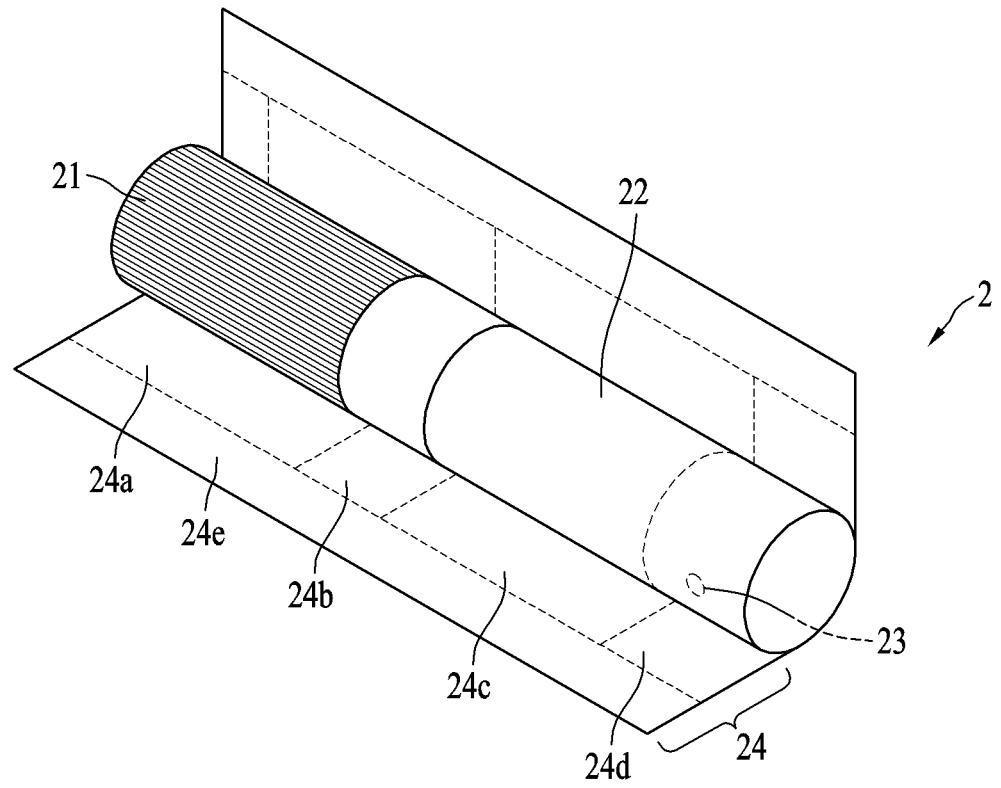
FIGS. 11 and 12 are diagrams illustrating examples of a cigarette according to an example embodiment.
Figure 12:
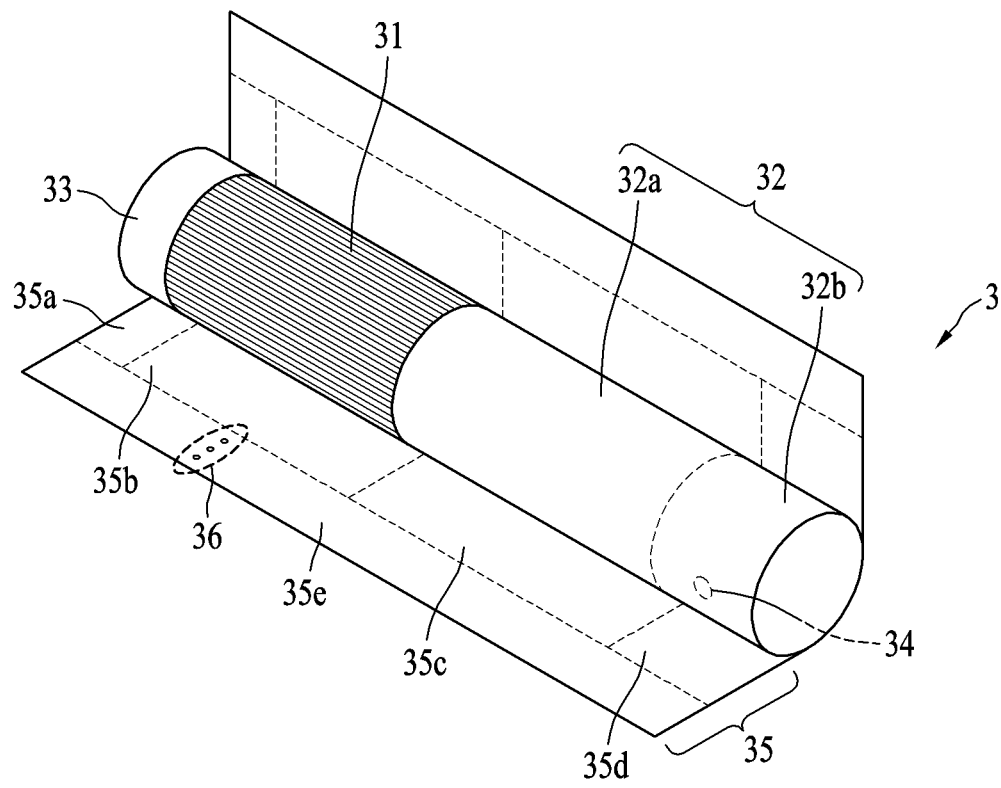

FIGS. 11 and 12 are perspective views of examples of a cigarette according to an example embodiment.

A cigarette 2 shown in FIGS. 11 and 12 may correspond to the cigarette 2 described above with reference to FIG. 1C.

Referring to FIG. 11, the cigarette 2 may include a tobacco rod 21 and a filter rod 22. The first portion and the second portion described above with reference to FIGS. 8 through 10 may include the tobacco rod 21 and the filter rod 22, respectively.

Although the filter rod 22 is illustrated as having a single segment in FIG. 11, examples of which are not limited thereto. That is, the filter rod 22 may include a plurality of segments. For example, the filter rod 22 may include a segment that cools an aerosol and a segment that filters out certain components contained in an aerosol. In addition, the filter rod 22 may further include at least one segment that performs another function, as needed.

A diameter of the cigarette 2 may be in a range of 5 millimeters (mm) to 9 mm, and a length thereof may be approximately 48 mm. However, the cigarette 2 is not limited thereto. For example, a length of the tobacco rod 21 may be approximately 12 mm, a length of a first segment of the filter rod 22 may be approximately 10 mm, a length of a second segment of the filter rod 22 may be approximately 14 mm, and a length of a third segment of the filter rod 22 may be approximately 12 mm. However, examples are not limited thereto.

The cigarette 2 may be wrapped with at least one wrapper 24. The wrapper 24 may have at least one hole through which external air is introduced or internal gas is discharged outside. For example, the cigarette 2 may be wrapped with one wrapper 24. For another example, the cigarette 2 may be wrapped with two or more wrappers 24 in an overlapping manner. For example, the tobacco rod 21 may be wrapped with a first wrapper 24a, and the filter rod 22 may be wrapped with wrappers 24b, 24c and 24d. In addition, the cigarette 2 may be entirely wrapped again with a single wrapper 24e. For example, when the filter rod 22 includes a plurality of segments, the segments may be wrapped with the wrappers 24b, 24c, and 24d, respectively.

The first wrapper 24a and the second wrapper 24b may be formed of general filter wrapping paper. For example, the first wrapper 24a and the second wrapper 24b may be porous wrapping paper or non-porous wrapping paper. In addition, the first wrapper 24a and the second wrapper 24b may be formed of oilproof paper and/or an aluminum laminated wrapping material.

The third wrapper 24c may be formed of hard wrapping paper. For example, a basis weight of the third wrapper 24c may be in a range of 88 grams per square meter (g/m 2) to 96 g/m², and may be in a range of 90 g/m² to 94 g/m². In addition, a thickness of the third wrapper 24c may be in a range of 120 micrometers (μm) to 130 μm, and may be 125 μm.

The fourth wrapper 24d may be formed of oilproof hard wrapping paper. For example, a basis weight of the fourth wrapper 24d may be in a range of 88 g/m² to 96 g/m², and may be in a range of 90 g/m² to 94 g/m². In addition, a thickness of the fourth wrapper 24d may be in a range of 120 μm to 130 μm, and may be 125 μm.

The fifth wrapper 24e may be formed of sterile paper (e.g., MFW). The sterilized paper (MFW) refers to paper specially prepared to enhance tensile strength, water resistance, smoothness, or the like, compared to general paper. For example, a basis weight of the fifth wrapper 24e may be in a range of 57 g/m² to 63 g/m², and may be 60 g/m². In addition, a thickness of the fifth wrapper 24e may be in a range of 64 μm to 70 μm, and may be 67 μm.

The fifth wrapper 24e may have a predetermined material internally added thereto. The material may be, for example, silicon, but is not limited thereto. Silicon may have properties, such as, for example, heat resistance which is characterized by less change by temperature, oxidation resistance which refers to resistance to oxidation, resistance to various chemicals, water repellency against water, or electrical insulation. However, silicon may not be necessarily used, but any material having such properties described above may be applied (or coated) on the fifth wrapper 24e without limitation.

The fifth wrapper 24e may prevent the cigarette 2 from burning. For example, there may be a probability that the cigarette 2 burns when the tobacco rod 21 is heated by the heater 13. For example, when the temperature rises above an ignition point of any one of materials included in the tobacco rod 21, the cigarette 2 may burn. Even in this case, it may still be possible to prevent the cigarette 2 from burning because the fifth wrapper 24e includes a non-combustible material.

In addition, the fifth wrapper 24e may prevent a holder 1 from being contaminated by substances produced in the cigarette 2. For example, liquid substances may be produced in the cigarette 2 by puffs from the user. For example, as an aerosol generated in the cigarette 2 is cooled by external air, such liquid substances (e.g., water, etc.) may be produced. Thus, wrapping the cigarette 2 with the fifth wrapper 24e may prevent the liquid substances produced in the cigarette 2 from leaking out of the cigarette 2.

The tobacco rod 21 may include an aerosol-generating material. The aerosol-generating material may include, for example, at least one of glycerin, propylene glycol, ethylene glycol, dipropylene glycol, diethylene glycol, triethylene glycol, tetraethylene glycol, or oleyl alcohol, but is not limited thereto. The tobacco rod 21 may also include other additives, such as, for example, a flavoring agent, a wetting agent, and/or an organic acid. In addition, the tobacco rod 21 may include a flavoring liquid such as menthol or a moisturizing agent that is added as being sprayed onto the tobacco rod 21.

The tobacco rod 21 may be manufactured in various forms. For example, the tobacco rod 21 may be manufactured as a sheet or as a strand. The tobacco rod 21 may also be formed as cut tobacco from finely cut tobacco sheets. In addition, the tobacco rod 21 may be enveloped by a heat-conductive material. The heat-conductive material may be, for example, a metal foil such as an aluminum foil, but is not limited thereto. For example, the heat-conductive material enveloping the tobacco rod 21 may evenly distribute the heat transferred to the tobacco rod 21 to improve the thermal conductivity to be applied to the tobacco rod 21, thereby improving the taste of tobacco. In addition, the heat-conductive material enveloping the tobacco rod 21 may function as a susceptor heated by an inductive heater. In this case, the tobacco rod 21 may further include an additional susceptor in addition to the heat-conductive material enveloping the outside thereof.

The filter rod 22 may be a cellulose acetate filter. However, there is no limit to the shape of the filter rod 22. For example, the filter rod 22 may be a cylindrical rod, or a tubular rod including a hollow therein. The filter rod 22 may also be a recess-type rod. For example, when the filter rod 22 includes a plurality of segments, at least one of the segments may be manufactured in a different shape.

In this example, a first segment of the filter rod 22 may be a cellulose acetate filter. For example, the first segment may be a tubular structure including a hollow therein. In this example, the first segment may prevent internal materials of the tobacco rod 21 from being pushed back when the heater 13 is inserted and generate an aerosol cooling effect. A diameter of the hollow included in the first segment may be adopted from a range of 2 mm to 4.5 mm, but is not limited thereto.

A length of the first segment may be adopted from a range of 4 mm to 30 mm, but is not limited thereto. The length of the first segment may be 10 mm, but is not limited thereto.

The first segment may have a hardness that is adjustable through an adjustment of the content of a plasticizer in a process of manufacturing the first segment. In addition, the first segment may be manufactured by inserting a structure such as a film or a tube of the same or different materials inside (e.g., the hollow).

A second segment of the filter rod 22 may cool an aerosol generated as the heater 13 heats the tobacco rod 21. The user may thus inhale the aerosol cooled down to a suitable temperature.

A length or diameter of the second segment may be determined in various ways according to the shape of the cigarette 2. For example, a length of the second segment may be adopted from a range of 7 mm to 20 mm. The length of the second segment may be approximately 14 mm, but is not limited thereto.

The second segment may be manufactured by weaving polymer fiber. In this case, a flavoring liquid may be applied to fiber formed of a polymer. Alternatively, the second segment may be manufactured by weaving a separate fiber to which a flavoring liquid is applied and the fiber formed of the polymer together. Alternatively, the second segment may be formed with a crimped polymer sheet.

For example, the polymer may be prepared with a material selected from the group consisting of polyethylene (PE), polypropylene (PP), polyvinyl chloride (PVC), polyethylene terephthalate (PET), polylactic acid (PLA), cellulose acetate (CA,) and aluminum foil.

As the second segment is formed with the woven polymer fiber or the crimped polymer sheet, the second segment may include a single channel or a plurality of channels extending in a longitudinal direction. A channel used herein may refer to a path through which a gas (e.g., air or aerosol) passes.

For example, the second segment formed with the crimped polymer sheet may be formed of a material having a thickness between approximately 5 μm and approximately 300 μm, for example, between approximately 10 μm and approximately 250 μm. In addition, a total surface area of the second segment may be between approximately 300 $mm^2/$ mm and approximately 1000 $mm^2$/mm. Further, an aerosol cooling element may be formed from a material having a specific surface area between approximately 10 $mm^2$/mg and approximately 100 $mm^2$/mg.

The second segment may include a thread containing a volatile flavor ingredient. The volatile flavor ingredient may be menthol, but is not limited thereto. For example, the thread may be filled with a sufficient amount of menthol to provide at least 1.5 milligrams (mg) of menthol to the second segment.

A third segment of the filter rod 22 may be a cellulose acetate filter. A length of the third segment may be adopted from a range of 4 mm to 20 mm. For example, the length of the third segment may be approximately 12 mm, but is not limited thereto.

The third segment may be manufactured such that a flavor is generated by spraying a flavoring liquid onto the third segment in a process of manufacturing the third segment. Alternatively, a separate fiber to which the flavoring liquid is applied may be inserted into the third segment. An aerosol generated in the tobacco rod 21 may be cooled as it passes through the second segment of the filter rod 22, and the cooled aerosol may pass through the third segment into the user. Accordingly, when a flavoring element is added to the third segment, the durability of the flavor to be carried to the user may be enhanced.

In addition, the filter rod 22 may include at least one capsule 23. The capsule 23 may perform a function of generating a flavor, or a function of generating an aerosol. For example, the capsule 23 may be of a structure in which a liquid containing a fragrance is wrapped with a film. The capsule 23 may have a spherical or cylindrical shape, but is not limited thereto.

Referring to FIG. 12, a cigarette 3 may further include a front end plug 33. The front end plug 33 may be disposed on one side of a tobacco rod 31 opposite to a filter rod 32. The front end plug 33 may prevent the tobacco rod 31 from escaping to the outside, and may also prevent an aerosol liquefied from the tobacco rod 31 during smoking from flowing into an aerosol-generating device (e.g., the aerosol-generating device 1 of FIGS. 8 through 10).

The filter rod 32 may include a first segment 32a and a second segment 32b. The first segment 32a may correspond to the first segment of the filter rod 22 of FIG. 11, and the second segment 32b may correspond to the third segment of the filter rod 22 of FIG. 11.

A diameter and a total length of the cigarette 3 may correspond to the diameter and the total length of the cigarette 2 of FIG. 11. For example, a length of the front end plug 33 may be approximately 7 mm, a length of the tobacco rod 31 may be approximately 15 mm, a length of the first segment 32a may be approximately 12 mm, and a length of the second segment 32b may be approximately 14 mm. However, examples are not limited thereto.

The cigarette 3 may be wrapped with at least one wrapper 35. The wrapper 35 may have at least one hole through which external air flows inside or internal gas flows outside. For example, the front end plug 33 may be wrapped with a first wrapper 35a, the tobacco rod 31 may be wrapped with a second wrapper 35b, the first segment 32a may be wrapped with a third wrapper 35c, and the second segment 32b may be wrapped with a fourth wrapper 35d. In addition, the cigarette 3 may be entirely wrapped again with a fifth wrapper 35e.

In addition, at least one perforation 36 may be formed on the fifth wrapper 35e. For example, the perforation 36 may be formed in an area surrounding the tobacco rod 31, but is not limited thereto. The perforation 36 may perform a function of transferring heat generated by the heater 13 shown in FIGS. 9 and 10 to the inside of the tobacco rod 31.

In addition, the second segment 32b may include at least one capsule 34. The capsule 34 may perform a function of generating a flavor or a function of generating an aerosol. For example, the capsule 34 may have a structure in which a liquid containing a fragrance is wrapped with a film. The capsule 34 may have a spherical or cylindrical shape, but is not limited thereto.

The first wrapper 35a may be a combination of general filter wrapping paper and a metal foil such as an aluminum foil. For example, a total thickness of the first wrapper 35a may be in a range of 45 μm to 55 μm, and may be 50.3 μm. In addition, a thickness of the metal foil of the first wrapper 35a may be in a range of 6 μm to 7 μm, and may be 6.3 μm. In addition, a basis weight of the first wrapper 35a may be in a range of 50 g/m² to 55 g/m², and may be 53 g/m².

The second wrapper 35b and the third wrapper 35c may be formed with general filter wrapping paper. The second wrapper 35b and the third wrapper 35c may each be, for example, porous wrapping paper or non-porous wrapping paper.

For example, the porosity of the second wrapper 35b may be 35000 CU, but is not limited thereto. In addition, a thickness of the second wrapper 35b may be in a range of 70 μm to 80 μm, and may be 78 μm. In addition, a basis weight of the second wrapper 35b may be in a range of 20 g/m² to 25 g/m², and may be 23.5 g/m².

For example, the porosity of the third wrapper 35c may be 24000 CU, but is not limited thereto. In addition, a thickness of the third wrapper 35c may be in a range of 60 μm to 70

μm, and may be 68 μm. In addition, a basis weight of the third wrapper 35c may be in a range of 20 g/m² to 25 g/m², and may be 21 g/m².

The fourth wrapper 35d may be formed with polylactic acid (PLA) laminated paper. The PLA laminated paper may refer to three-ply paper including a paper layer, a PLA layer, and a paper layer. For example, a thickness of the fourth wrapper 35d may be in a range of 100 μm to 120 μm, and may be 110 μm. In addition, a basis weight of the fourth wrapper 35d may be in a range of 80 g/m² to 100 g/m², and may be 88 g/m².

The fifth wrapper 35e may be formed of sterile paper (e.g., MFW). The sterile paper (MFW) may refer to paper specially prepared such that it has enhanced tensile strength, water resistance, smoothness, or the like, compared to general paper. For example, a basis weight of the fifth wrapper 35e may be in a range of 57 g/m² to 63 g/m², and may be 60 g/m². In addition, a thickness of the fifth wrapper 35e may be in a range of 64 μm to 70 μm, and may be 67 μm.

The fifth wrapper 35e may have a predetermined material internally added thereto. The material may be, for example, silicon, but is not limited thereto. Silicon may have properties, such as, for example, heat resistance which is characterized by less change by temperature, oxidation resistance which refers to resistance to oxidation, resistance to various chemicals, water repellency against water, or electrical insulation. However, silicon may not be necessarily used, but any material having such properties described above may be applied (or coated) to the fifth wrapper 35e without limitation.

The front end plug 33 may be formed of cellulose acetate. For example, the front end plug 33 may be manufactured by adding a plasticizer (e.g., triacetin) to cellulose acetate tow. A mono denier of a filament constituting the cellulose acetate tow may be in a range of 1.0 to 10.0, and may be in a range of 4.0 to 6.0. The mono denier of the filament of the front end plug 33 may be 5.0. In addition, a cross section of the filament constituting the front end plug 33 may be Y-shaped. A total denier of the front end plug 33 may be in a range of 20000 to 30000, and may be in a range of 25000 to 30000. The total denier of the front end plug 33 may be 28000.

In addition, as needed, the front end plug 33 may include at least one channel, and a cross section of the channel may be provided in various shapes.

The tobacco rod 31 may correspond to the tobacco rod 21 described above with reference to FIG. 11. Thus, a more detailed and repeated description of the tobacco rod 31 will be omitted here for conciseness.

The first segment 32a may be formed of cellulose acetate. For example, the first segment 32a may be a tubular structure including a hollow therein. The first segment 32a may be manufactured by adding a plasticizer (e.g., triacetin) to cellulose acetate tow. For example, a mono denier and a total denier of the first segment 32a may be the same as the mono denier and the total denier of the front end plug 33.

The second segment 32b may be formed of cellulose acetate. A mono denier of a filament constituting the second segment 32b may be in a range of 1.0 to 10.0, and may be in a range of 8.0 to 10.0. The mono denier of the filament of the second segment 32b may be 9.0. In addition, a cross section of the filament of the second segment 32b may be Y-shaped. A total denier of the second segment 32b may be in a range of 20000 to 30000, and may be 25000.

Figure 13:
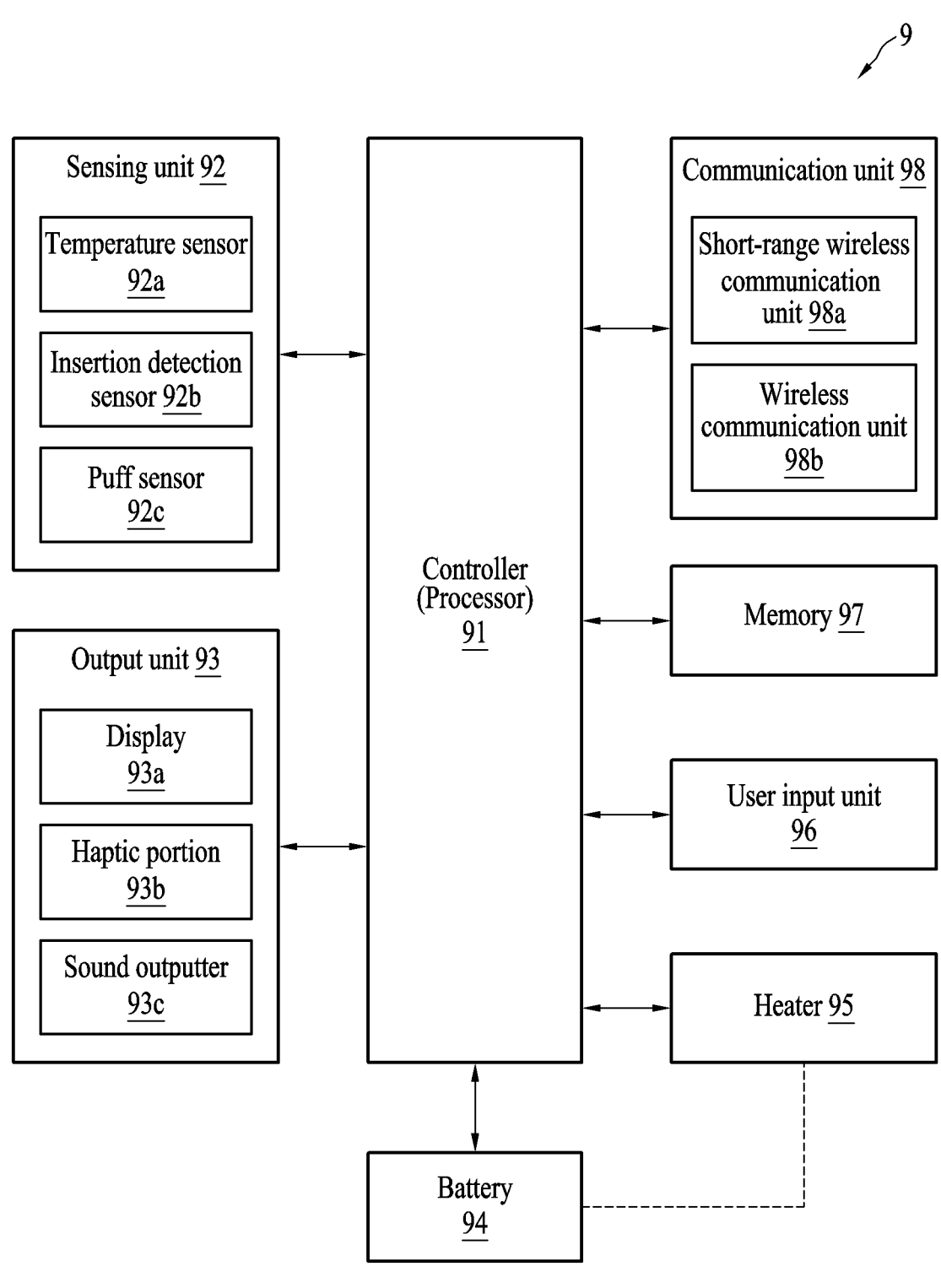
FIG. 13 is a block diagram illustrating an aerosol-generating device according to another example embodiment.

FIG. 13 is a block diagram illustrating an aerosol-generating device 9 according to another example embodiment.

The aerosol-generating device 9 described below may correspond to the electronic device 100 described above with reference to FIG. 1A through 2. A display 93a or a user input unit 96 may correspond to the display unit 220 described above with reference to FIG. 2 or the display 120 described above with reference to FIGS. 1A through 1C. A battery 94 may correspond to the battery 230 described above with reference to FIG. 2. A heater 95 may correspond to the heater 240 described above with reference to FIG. 2.

According to an example embodiment, the aerosol-generating device 9 may include a controller 91, a sensing unit 92, an output unit 93, a battery 94, a heater 95, a user input unit 96, a memory 97, and a communication unit 98. However, an internal structure of the aerosol-generating device 9 is not limited to what is shown in FIG. 13. It is to be understood by those having ordinary skill in the art to which the present disclosure pertains that some of the components shown in FIG. 13 may be omitted or new components may be added according to the design of the aerosol-generating device 9.

The sensing unit 92 may sense a state of the aerosol-generating device 9 or a state of an environment around the aerosol-generating device 9, and transmit sensing information obtained through the sensing to the controller 91. Based on the sensing information, the controller 91 may control the aerosol-generating device 9 to control operations of the heater 95, restrict smoking, determine whether an aerosol-generating item (e.g., a cigarette, a cartridge, etc.) is inserted, display a notification, and perform other functions.

The sensing unit 92 may include at least one of a temperature sensor 92a, an insertion detection sensor 92b, or a puff sensor 92c, but is not limited thereto.

The temperature sensor 92a may sense a temperature at which the heater 95 (or an aerosol-generating material) is heated. The aerosol-generating device 9 may include a separate temperature sensor for sensing a temperature of the heater 95, or the heater 95 itself may perform a function as a temperature sensor. Alternatively, the temperature sensor 92a may be arranged around the battery 94 to monitor a temperature of the battery 94.

The insertion detection sensor 92b may sense whether the aerosol-generating item is inserted or removed. The insertion detection sensor 92b may include, for example, at least one of a film sensor, a pressure sensor, a light sensor, a resistive sensor, a capacitive sensor, an inductive sensor, or an infrared sensor, which may sense a signal change by the insertion or removal of the aerosol-generating item.

The puff sensor 92c may sense a puff from a user based on various physical changes in an airflow path or airflow channel. For example, the puff sensor 92c may sense the puff based on any one of a temperature change, a flow change, a voltage change, and a pressure change.

The sensing unit 92 may further include at least one of a temperature/humidity sensor, a barometric pressure sensor, a magnetic sensor, an acceleration sensor, a gyroscope sensor, a position sensor (e.g., a global positioning system (GPS)), a proximity sensor, and a red, green, blue (RGB) sensor (e.g., an illuminance sensor), in addition to the sensors 92a through 92c described above. A function of each sensor may be intuitively inferable from its name by those having ordinary skill in the art, and thus a more detailed description thereof will be omitted here.

The output unit 93 may output information about the state of the aerosol-generating device 9 and provide the information to the user. The output unit 93 may include at least one of a display 93a, a haptic portion 93b, or a sound outputter 93c, but is not limited thereto. When the display 93a and a touchpad are provided in a layered structure to form a touchscreen, the display 93a may be used as an input device in addition to an output device.

The display 93a may visually provide the information about the aerosol-generating device 9 to the user. The information about the aerosol-generating device 9 may include, for example, a charging/discharging state of the battery 94 of the aerosol-generating device 9, a preheating state of the heater 95, an insertion/removal state of the aerosol-generating item, a limited usage state (e.g., an abnormal item detected) of the aerosol-generating device 9, or the like, and the display 93a may externally output the information. The display 93a may be, for example, a liquid-crystal display panel (LCD), an organic light-emitting display panel (OLED), or the like. The display 93a may also be in the form of a light-emitting diode (LED) device.

The haptic portion 93b may provide the information about the aerosol-generating device 9 to the user in a haptic way by converting an electrical signal into a mechanical stimulus or an electrical stimulus. The haptic portion 93b may include, for example, a motor, a piezoelectric element, or an electrical stimulation device.

The sound outputter 93c may provide the information about the aerosol-generating device 9 to the user in an auditory way. For example, the sound outputter 93c may convert an electric signal into a sound signal and externally output the sound signal.

The battery 94 may supply power to be used to operate the aerosol-generating device 9. The battery 94 may supply power to heat the heater 95. In addition, the battery 94 may supply power required for operations of the other components (e.g., the sensing unit 92, the output unit 93, the user input unit 96, the memory 97, and the communication unit 98) included in the aerosol-generating device 9. The battery 94 may be a rechargeable battery or a disposable battery. The battery 94 may be, for example, a lithium polymer (LiPoly) battery, but is not limited thereto.

The heater 95 may receive power from the battery 94 to heat the aerosol-generating material. According to an embodiment, the aerosol-generating device 9 may further include a power conversion circuit (e.g., a direct current (DC)-to-DC (DC/DC) converter) that converts power of the battery 94 and supplies the power to the heater 95. In addition, when the aerosol-generating device 9 generates an aerosol by an inductive heating method, the aerosol-generating device 9 may further include a DC-to-alternating current (AC) (DC/AC) converter that converts DC power of the battery 94 into AC power.

The controller 91, the sensing unit 92, the output unit 93, the user input unit 96, the memory 97, and the communication unit 98 may receive power from the battery 94 to perform functions. According to an embodiment, the aerosol-generating device 9 may further include a power conversion circuit, for example, a low dropout (LDO) circuit or a voltage regulator circuit, which converts power of the battery 94 and supplies the power to respective components.

According to an example embodiment, the heater 95 may be formed of an electrically resistive material that is suitable. The electrically resistive material may be a metal or a metal alloy including, for example, titanium, zirconium, tantalum, platinum, nickel, cobalt, chromium, hafnium, niobium, molybdenum, tungsten, tin, gallium, manganese, iron, copper, stainless steel, nichrome, or the like, but is not limited thereto. In addition, the heater 95 may be implemented as a metal heating wire, a metal heating plate on which an electrically conductive track is arranged, a ceramic heating element, or the like, but is not limited thereto.

According to another example embodiment, the heater 95 may be an inductive heating-type heater. For example, the heater 95 may include a susceptor that heats the aerosol-generating material by generating heat through a magnetic field applied by a coil.

According to an example embodiment, the heater 95 may include a plurality of heaters. For example, the heater 95 may include a first heater for heating a cigarette and a second heater for heating a liquid.

The user input unit 96 may receive information input from the user or may output information to the user. For example, the user input unit 96 may include a key pad, a dome switch, a touchpad (e.g., a contact capacitive type, a pressure resistive film type, an infrared sensing type, a surface ultrasonic conduction type, an integral tension measurement type, a piezo effect method, etc.), a jog wheel, a jog switch, or the like, but is not limited thereto. In addition, the aerosol-generating device 9 may further include a connection interface such as a USB interface, and may be connected to another external device through the connection interface such as a USB interface to transmit and receive information or to charge the battery 94.

The memory 97, which is hardware for storing various pieces of data processed in the aerosol-generating device 9, may store data processed by the controller 91 and data to be processed thereby. The memory 97 may include a storage medium of at least one type, for example, a flash memory type, a hard disk type, a multimedia card micro type, a card type memory (e.g., an SD or XE memory), a random-access memory (RAM), a static RAM (SRAM), a read-only memory (ROM), an electrically erasable programmable ROM (EEPROM), a programmable ROM (PROM), a magnetic memory, a magnetic disk, and an optical disc. The memory 97 may store an operating time of the aerosol-generating device 9, a maximum number of puffs, a current number of puffs, at least one temperature profile, data associated with a smoking pattern of the user, or the like.

The communication unit 98 may include at least one component for communicating with another electronic device. For example, the communication unit 98 may include a short-range communication unit 98a and a wireless communication unit 98b.

The short-range communication unit 98a may include, for example, a Bluetooth communication unit, a Bluetooth low energy (BLE) communication unit, a near-field communication (NFC) unit, a wireless local area network (WLAN) (or Wi-Fi) communication unit, a Zigbee communication unit, an infrared data association (IrDA) communication unit, a Wi-Fi direct (WFD) communication unit, an ultra-wideband (UWB) communication unit, an Ant+ communication unit, or the like. However, the examples of which are not limited thereto.

The wireless communication unit 98b may include, for example, a cellular network communication unit, an Internet communication unit, a computer network (e.g., a local area network (LAN) or a wide-area network (WAN)) communication unit, or the like. However, examples of which are not limited thereto. The wireless communication unit 98b may use subscriber information (e.g., international mobile subscriber identity (IMSI)) to identify and authenticate the aerosol-generating device 9 in a communication network.

The controller 91 may control the overall operation of the aerosol-generating device 9. According to an example embodiment, the controller 91 may include at least one processor. The processor may be implemented as an array of a plurality of logic gates, or may be implemented as a combination of a general-purpose microprocessor and a memory in which a program executable by the microprocessor is stored. In addition, it is to be understood by those having ordinary skill in the art to which the present disclosure pertains that it may be implemented in other types of hardware.

The controller 91 may control the temperature of the heater 95 by controlling the supply of power from the battery 94 to the heater 95. For example, the controller 91 may control the supply of power by controlling switching of a switch element between the battery 94 and the heater 95. For another example, a direct heating circuit may control the supply of power to the heater 95 according to a control command from the controller 91.

The controller 91 may analyze a sensing result obtained by the sensing of the sensing unit 92 and control processes to be performed thereafter. For example, the controller 91 may control power to be supplied to the heater 95 to start or end an operation of the heater 95 based on the sensing result obtained by the sensing unit 92. For another example, the controller 91 may control an amount of power to be supplied to the heater 95 and a time for which the power is to be supplied, such that the heater 95 may be heated up to a predetermined temperature or maintained at a desired temperature, based on the sensing result of the sensing unit 92.

The controller 91 may control the output unit 93 based on the sensing result of the sensing unit 92. For example, when the number of puffs counted through the puff sensor 92c reaches a preset number, the controller 91 may inform the user that the aerosol-generating device 9 is to be ended soon, through at least one of the display 93a, the haptic portion 93b, or the sound outputter 93c.

According to an example embodiment, the controller 91 may control a power supply time and/or a power supply amount for the heater 95 according to a state of the aerosol-generating item sensed by the sensing unit 92. For example, when the aerosol-generating item is in an over-humidified state, the controller 91 may control the power supply time for an inductive coil to increase a preheating time, compared to a case where an aerosol-generating material is in a general state.

The methods according to the example embodiments described herein may be recorded in non-transitory computer-readable media including program instructions to implement various operations of the example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random-access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The devices described above may be configured to act as one or more software modules in order to perform the operations of the example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software may also be distributed over network coupled computer systems so that the software is stored and executed in a distributed fashion. The software and data may be stored by one or more non-transitory computer readable recording mediums. The non-transitory computer readable recording mediums may include any data storage device that can store data which can be thereafter read by a computer system or processing device.

While this disclosure includes specific example embodiments, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of unlocking performed by an aerosol-generating device, the method comprising:
controlling an operation of the aerosol-generating device;
displaying a screen for verification, and receiving a user input for the verification;
determining whether a user is a registered user in the aerosol-generating device based on a user input to the screen; and
based on determining that the user is the registered user, unlocking the aerosol-generating device; and
displaying an icon corresponding to a preset operation in a locked state of the aerosol-generating device.

2. The method of claim 1, further comprising:
based on determining that the user is not the registered user based on the user input, displaying the screen again; and
when a number of times the user is determined to not be the registered user exceeds a threshold number of times, limiting a use of the aerosol-generating device.

3. A method of unlocking performed by an aerosol-generating device, the method comprising:
displaying a screen for verification;
determining whether a user is a registered user in the aerosol-generating device based on a user input to the screen; and based on determining that the user is the registered user, unlocking the aerosol-generating device;
displaying an icon corresponding to a preset operation in a locked state of the aerosol-generating device; and
when a touch input to the icon is received from the user, executing the preset operation.

4. The method of claim 3, wherein the preset operation is heating an aerosol-generating substrate of a cigarette inserted in the aerosol-generating device.

5. The method of claim 1, wherein the determining whether the user is the registered user comprises:
determining whether the user is the registered user based on at least one of an input of a personal identification number (PIN) and an input of a pattern.

6. The method of claim 5, wherein the PIN and the pattern are previously registered.

7. The method of claim 1, wherein the user input is any one of a button input and a touch input.

8. A non-transitory computer-readable storage medium storing instructions that are executable by a processor to perform the unlocking method of claim 1.

9. An aerosol-generating device performing a method of unlocking, comprising:
a controller configured to control an operation of the aerosol-generating device;
a display configured to display a screen for verification, and receive a user input for the verification;
an inserter into which a cigarette is inserted; and
a heater configured to heat an aerosol-generating substrate of the cigarette,
wherein the controller is configured to:
determine whether a user is a registered user in the aerosol-generating device based on a user input to the screen; and
based on determining that the user is the registered user, unlock the aerosol-generating device; and
display an icon corresponding to a preset operation in a locked state of the aerosol-generating device.

10. The aerosol-generating device of claim 9, wherein the controller is further configured to:
based on determining that the user is not the registered user, display the screen again; and
when a number of times the user is determined to not be the registered user exceeds a threshold number of times, limit a use of the aerosol-generating device.

11. The aerosol-generating device of claim 9, wherein the controller is further configured to
when a touch input to the icon is received from the user, execute the preset operation.

12. The aerosol-generating device of claim 11, wherein the preset operation is heating the aerosol-generating substrate of the cigarette inserted in the aerosol-generating device.

13. The aerosol-generating device of claim 9, wherein the controller is further configured to:
determine whether the user is the registered user based on at least one of an input of a personal identification number (PIN) and an input of a pattern.

14. The aerosol-generating device of claim 13, wherein the PIN and the pattern are previously registered.

15. The aerosol-generating device of claim 9, wherein the user input is any one of a button input and a touch input.

* * * * *